(12) United States Patent
Kondo et al.

(10) Patent No.: US 7,625,313 B2
(45) Date of Patent: Dec. 1, 2009

(54) SHIFT CONTROL DEVICE AND SHIFT CONTROL METHOD OF VEHICULAR AUTOMATIC TRANSMISSION

(75) Inventors: Tomohiro Kondo, Toyota (JP); Yoji Takanami, Anjou (JP); Atsushi Ayabe, Nagoya (JP); Masami Kondo, Toyota (JP); Masaharu Tanaka, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 395 days.

(21) Appl. No.: 11/633,614

(22) Filed: Dec. 5, 2006

(65) Prior Publication Data

US 2007/0129214 A1 Jun. 7, 2007

(30) Foreign Application Priority Data

Dec. 6, 2005 (JP) ............................. 2005-352007
Apr. 10, 2006 (JP) ............................. 2006-107946

(51) Int. Cl.
*F16H 61/26* (2006.01)
*F16H 61/00* (2006.01)
*F16H 31/00* (2006.01)
*G06F 7/00* (2006.01)
*G06F 17/00* (2006.01)

(52) U.S. Cl. ...................... 477/144; 477/135; 475/120; 475/127; 701/55; 701/62

(58) Field of Classification Search .................. 477/70, 477/71, 135, 144, 139; 475/116, 118, 120, 475/127; 701/51, 55, 62, 65
See application file for complete search history.

(56) References Cited

U.S. PATENT DOCUMENTS

| 6,626,797 B2 * | 9/2003 | Shiiba et al. | 477/97 |
| 6,740,005 B2 * | 5/2004 | Watanabe et al. | 477/110 |
| 7,393,305 B2 * | 7/2008 | Yamada et al. | 477/110 |

FOREIGN PATENT DOCUMENTS

| JP | 10-122357 A | 5/1998 |
| JP | 2001-65680 A | 3/2001 |
| JP | 2003-269601 A | 9/2003 |
| JP | 2005076782 A * | 3/2005 |

OTHER PUBLICATIONS

Translation of JP 10122357 (Information disclosure statement prior art).*

* cited by examiner

*Primary Examiner*—Tisha D Lewis
(74) *Attorney, Agent, or Firm*—Sughrue Mion, PLLC

(57) ABSTRACT

In a shift control device and a shift control method of a vehicular automatic transmission that performs a coast downshift by engagement switch between a release-side engagement element and an element-side engagement element at a time of deceleration of a vehicle, it is determined whether or not there is a driver's intention to decelerate the vehicle during the coast downshift. If an affirmative determination is made regarding the intention to decelerate the vehicle, the rise of engagement pressure of the engagement-side engagement element is stopped so as to cause the coast downshift not to progress. If a negative determination is made regarding the intention to decelerate the vehicle while the rise of the engagement pressure has been stopped, the engagement pressure of the engagement-side engagement element is raised again so as to cause the coast downshift to progress.

14 Claims, 16 Drawing Sheets

| | C1 | C2 | C3 | C4 | B1 | B2 | F1 |
|---|---|---|---|---|---|---|---|
| P | | | | | | | |
| Rev1 | | | ○ | | | ○ | |
| Rev2 | | | | ○ | | ○ | |
| N | | | | | | | |
| 1st | ○ | | | | | (○) | ○ |
| 2nd | ○ | | | | ○ | | |
| 3rd | ○ | | ○ | | | | |
| 4th | ○ | | | ○ | | | |
| 5th | ○ | ○ | | | | | |
| 6th | | ○ | | ○ | | | |
| 7th | | ○ | ○ | | | | |
| 8th | | ○ | | | ○ | | |

○ : ENGAGED

|  | C1' | C1' | B1' | B2' | B3' | F1' |
|---|---|---|---|---|---|---|
| 1ST | O |  |  | ◎ |  | △ |
| 2ND | O |  | O |  |  |  |
| 3RD | O |  |  |  | O |  |
| 4TH | O | O |  |  |  |  |
| 5TH |  | O |  |  | O |  |
| 6TH |  | O | O |  |  |  |
| R |  |  |  | O | O |  |
| N |  |  |  |  |  |  |

◎ OPERATED AT TIME OF ENGINE BRAKING
△ OPERATED ONLY IN DRIVING CONDITION

SHIFT CONTROL DEVICE AND SHIFT CONTROL METHOD OF VEHICULAR AUTOMATIC TRANSMISSION

INCORPORATION BY REFERENCE

The disclosure of Japanese Patent Applications No. 2005-352007 filed on Dec. 6, 2005 and No. 2006-107946 filed on Apr. 10, 2006 including the specification, drawings and abstract is incorporated herein by reference in its entirety.

BACKGROUND OF THE INVENTION

1. Field of the Invention

The invention relates to a shift control device and a shift control method and a shift control method of a vehicular automatic transmission that establishes a plurality of gear steps of different gear ratios by selectively engaging a plurality of engagement elements. More particular, the invention relates to a technology of reducing the shift shock in a downshift (coast downshift) during a decelerating run (coasting run) of a vehicle.

2. Description of the Related Art

In relation to the vehicular automatic transmissions that establish a plurality of gear steps of different gear ratios by selectively engaging a plurality of engagement elements (engagement devices), there is a known technology for enabling a vehicle to accelerate in good response (responsiveness) by appropriate driving power when the vehicle is to be accelerated again from a decelerating state. In this technology, during a deceleration of the vehicle, a coast downshift is performed to prepare for depression of the accelerator pedal. Besides, in relation to a vehicular automatic transmission as mentioned above, Japanese Patent Application Publication No. JP-A-2003-269601 describes a control device of an automatic transmission in which when a coast downshift involving an engagement switch between a release-side friction engagement device and an engagement-side friction engagement device (clutch-to-clutch switch) is to be performed, a good shift characteristic is achieved by using a shift line provided for the coast downshift which is different from the shift lines for normal shifts.

However, in the above-described related art, in the case where a brake operation is performed during a shift, there is a possibility of failing to secure a control precision and therefore resulting in occurrence of a shift shock, because, for example, it may become difficult to engage the engagement-side engagement element at a predetermined synchronous timing depending on changes in the deceleration caused by the brake, or other incidents may occur. Therefore, a shift control device of a vehicular automatic transmission that reduces the shift shock while enabling the vehicle to accelerate in good response when the vehicle is to be accelerated again from a decelerating state has been demanded.

Generally, in the aforementioned clutch-to-clutch coast downshift, good control precision regarding the synchronous timing of engaging the engagement-side engagement device, or the like is required in order to reduce the shift shock involved in the coast downshift. However, in the case where a brake operation is performed during a coast downshift, there is a possibility of failing to secure a control precision and therefore resulting occurrence of a shift shock, because, for example, it may become difficult to engage the engagement-side engagement element at a predetermined synchronous timing depending on changes in the deceleration caused by the brake, or other incidents may occur.

To overcome this drawback, the following measure is conceivable. That is, if there is a driver's intention to decelerate the vehicle, such as a brake operation or the like, during a coast downshift, a shift wait control of stopping the rise of the engagement pressure of the engagement-side engagement device is performed. On the other hand, if there is no driver's intention to decelerate the vehicle during a coast downshift, the shift wait control is removed to cause the coast downshift to progress. In this manner, it may be possible to achieve both improved acceleration response at the time of re-acceleration from the decelerating state of the vehicle and reduced shift shock.

However, this measure has the following problem. That is, in the case where during the shift wait control, the input rotation speed of the automatic transmission has risen so that there is a great differential rotation speed (rotation speed difference) between the input rotation speed and the synchronous rotation speed for the shift-target gear step of the coast downshift, and where the driver's intention to decelerate the vehicle then disappears, so that the shift wait control is removed to cause the coast downshift to progress, there is possibility of occurrence of the problem of a large shift shock due to the large rotation speed difference.

SUMMARY OF THE INVENTION

The invention has been accomplished against the background of the aforementioned circumstances, and provides a shift control device and a shift control method of a vehicular automatic transmission which reduce the shift shock while enabling the vehicle to accelerate in good response when the vehicle is to be accelerated again from the decelerating state.

Accordingly, in a vehicular automatic transmission that establishes a plurality of gear steps of different gear ratios by selectively engaging a plurality of engagement elements, there is provided a shift control device of a vehicular automatic transmission that performs a coast downshift by engagement switch between a release-side engagement element and an engagement-side engagement element at a time of deceleration of a vehicle. This shift control device includes the following devices: a deceleration intention determination device that determines whether or not there is a driver's intention to decelerate the vehicle during the coast downshift; a shift wait device that stops a rise of an engagement pressure of the engagement-side engagement element so as to cause the coast downshift not to progress, if the deceleration intention determination device makes an affirmative determination; and a shift progress device that raises again the engagement pressure of the engagement-side engagement element so as to cause the coast downshift to progress, if the deceleration intention determination device makes a negative determination while the rise of the engagement pressure has been stopped by the shift wait device.

According to another aspect of the invention, in a vehicular automatic transmission that establishes a plurality of gear steps of different gear ratios by selectively engaging a plurality of engagement elements, there is provided a shift control method of a vehicular automatic transmission that performs a coast downshift by engagement switch between a release-side engagement element and an engagement-side engagement element at a time of deceleration of a vehicle. This shift control method includes: determining whether or not there is a driver's intention to decelerate the vehicle during the coast downshift; stopping a rise of an engagement pressure of the engagement-side engagement element so as to cause the coast downshift not to progress, if an affirmative determination is made regarding the intention to decelerate the vehicle; and raising again the engagement pressure of the engagement-side engagement element so as to cause the coast downshift to progress, if a negative determination is made regarding the intention to decelerate the vehicle while the rise of the engagement pressure has been stopped.

According to the shift control device and the shift control method of the vehicular automatic transmission described above, it is determined whether or not there is a driver's intention to decelerate the vehicle during the coast downshift. If an affirmative determination is made regarding the intention to decelerate the vehicle, the rise of the engagement pressure of the engagement-side engagement element is stopped so as to cause the coast downshift not to progress. If a negative determination is made regarding the intention to decelerate the vehicle while the rise of the engagement pressure has been stopped, the engagement pressure of the engagement-side engagement element is raised again so as to cause the shift to progress. Therefore, if there is a driver's intention to decelerate the vehicle, that is, if it is considered that there is an intention to change from the decelerating state to the stopped state, the coast downshift is caused not to progress, so that the occurrence of a shift shock due to an unnecessary coast downshift can be prevented. Furthermore, if the driver's intention to decelerate the vehicle has disappeared, the coast downshift is caused to progress, so that the vehicle can be accelerated in good response when the vehicle is to be accelerated again from the decelerating state. That is, it is possible to reduce the shift shock while enabling the vehicle to accelerate in good response when the vehicle is to be accelerated again from a decelerating state.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 4 is a block diagram illustrating portions of a control system provided for controlling the automatic transmission shown in FIG. 1 and the like;

DETAILED DESCRIPTION OF THE PREFERRED EMBODIMENTS

In the following description and the accompanying drawings, the present invention will be described in more detail with reference to exemplary embodiments.

Figures 1, 2:
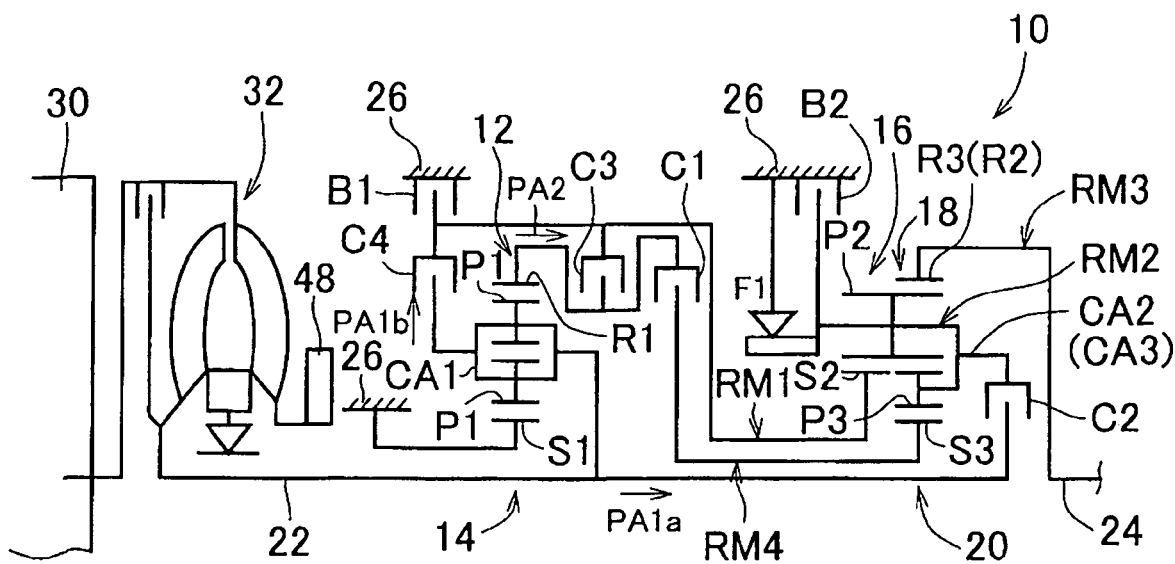
FIG. 1 is a skeleton diagram illustrating a construction of a vehicular automatic transmission applied to the first embodiment of the invention.
FIG. 2 is an operation table illustrating the operation of engagement elements for establishing a plurality of speed change steps in the automatic transmission shown in FIG. 1.

Firstly, a first embodiment of the invention will be described. FIG. 1 is a skeleton diagram illustrating a construction of a vehicular automatic transmission (hereinafter, simply referred to as "automatic transmission") applied to the first embodiment of the invention. FIG. 2 is an operation table illustrating the operation of engagement elements for establishing a plurality of speed change steps in the automatic transmission 10. The automatic transmission 10 has, in a transmission case (hereinafter, referred to as "case") 26 provided as a non-rotating member fitted to a vehicle body, a first speed changer portion 14 constructed mainly of a double pinion-type first planetary gear device 12, and a second speed changer portion 20 constructed mainly of a single pinion-type second planetary gear device 16 and a double pinion-type third planetary gear device 18, on a common axis. The automatic transmission 10 changes the rotation of an input shaft 22 in speed, and outputs it from an output shaft 24. The input shaft 22 corresponds to an input rotating member and, in the first embodiment, is a turbine shaft of a torque converter 32 that is rotationally driven by an engine 30 that is a motive power source for running the vehicle. The output shaft 24 corresponds to an output rotating member, and rotationally drives, for example, left and right driving wheels sequentially via a differential gear device (final speed reducer), a pair of axle shafts, etc. (not shown in the drawings). Incidentally, the automatic transmission 10 is constructed substantially symmetrically about the axis thereof, and the illustration of a half portion thereof below the axis is omitted in the skeleton diagram of FIG. 1.

The first planetary gear device 12 includes a sun gear S1, a plural pairs of pinions P1 that mesh with each other, a carrier CA1 supporting the pinions P1 so as to be rotatable about their own axes and revolvable, and a ring gear R1 meshing with the sun gear S1 via the pinions P1. The sun gear S1, the carrier CA1 and the ring gear R1 form three rotating elements. The carrier CA1 is coupled to the input shaft 22, and is rotationally driven, and the sun gear S1 is fixed integrally with the case 26 so as to be unrotatable. The ring gear R1 functions as an intermediate output member, and is rotated at reduced speed relative to the input shaft 22, and transmits rotation to the second speed changer portion 20. In the first embodiment, a path of transmitting the rotation of the input shaft 22 to the second speed changer portion 20 without changing the rotation speed is a first intermediate output path PA1 of transmitting rotation at a predetermined constant speed change ratio (=1.0). The first intermediate output path PA1 includes a direct-coupled path PA1a of transmitting rotation from the input shaft 22 to the second speed changer portion 20 without transmission through the first planetary gear device 12, and a indirect path PA1a of transmitting rotation from the input shaft 22 to the second speed changer portion 20 via the carrier CA1 of the first planetary gear device 12. Another path of transmitting rotation from the input shaft 22 to the second speed changer portion 20 via the carrier CA1, the pinions P1 disposed on the carrier CA1, and the ring gear R1 is a second intermediate output path PA2 of transmitting rotation of the input shaft 22 while changing the speed (reducing the speed) of rotation at a speed change ratio (>1.0) that is greater than that of the first intermediate output path PA1.

The second planetary gear device 16 includes a sun gear S2, pinions P2, a carrier CA2 supporting the pinions P2 so that they are rotatable about their own axe and revolvable, and a ring gear R2 meshing with the sun gear S2 via the pinions P2. The third planetary gear device 18 includes a sun gear S3, a plurality of pairs of pinions P2 and P3 meshing with each other; a carrier CA3 supporting the pinions P2 and P3 so that they are rotatable about their own axes and revolvable, and a ring gear R3 meshing with the sun gear S3 via the pinions P2 and P3.

In the second planetary gear device 16 and the third planetary gear device 18, the aforementioned components form four rotating elements RM1 to RM4 since some of the components are coupled to each other. Specifically, the sun gear S2 of the second planetary gear device 16 forms a first rotating element RM1, and the carrier CA2 of the second planetary gear device 16 and the carrier CA3 of the third planetary gear device 18 are integrally coupled to form a second rotating element RM2. Furthermore, the ring gear R2 of the second planetary gear device 16 and the ring gear R3 of the third planetary gear device 18 are integrally coupled to form a third rotating element RM3, and the sun gear S3 of the third planetary gear device 18 forms a fourth rotating element RM4. Thus, the second planetary gear device 16 and the third planetary gear device 18 are provided as a Ravigneaux type planetary gear train in which the carriers CA2 and CA3 are formed by a common member, and the ring gears R2 and R3 are formed by a common member, and the pinions P2 of the second planetary gear device 16 serve also as the second pinions of the third planetary gear device 18.

The automatic transmission 10 includes a clutch C1, a clutch C2, a clutch C3 and a clutch C4 (hereinafter, simply referred to as "clutches C" if not particularly distinguished), and a brake B1 and a brake B2 (hereinafter, simply referred to as "brakes B" if not particularly distinguished). The first rotating element RM1 (sun gear S2) is selectively coupled to the case 26 and therefore is stopped from rotating via the first brake B1, and is also selectively coupled to the ring gear R1 of the first planetary gear device 18 which is an intermediate output member via the third clutch C3 (i.e., the second intermediate output path PA2). Furthermore, the first rotating element RM1 is selectively coupled to the carrier CA1 of the first planetary gear device 12 via the fourth clutch C4 (i.e., the indirect path PA1a of the first intermediate output path PA1). The second rotating element RM2 (the carrier CA2 and CA3) is selectively coupled to the case 26 and therefore is stopped from rotating via the second brake B2, and is also selectively coupled to the input shaft 22 via the second clutch C2 (i.e., the direct-coupled path PA1a of the first intermediate output path PA1). The third rotating element RM3 (the ring gear R2 and R3) is coupled integrally to the output shaft 24 to output rotation. The fourth rotating element RM4 (the sun gear S3) is selective coupled to the ring gear R1 via the first clutch C1. A one-way clutch F1 for stopping reverse rotation of the second rotating element RM2 while allowing normal rotation of the second rotating element RM2 (the same rotational direction as that of the input shaft 22) is provided in parallel with the second brake B2, between the second rotating element RM2 and the case 26.

The operation table of FIG. 2 illustrates the states of operation of the clutches C1 to C4 and the brakes B1, B2 for establishing speed change steps (gear steps) of the automatic transmission 10, in which "◯" represents an engaged state, and "(◯)" represents an engaged state only during the engine brake, and each blank represents a released state. Since the one-way clutch F1 is provided in parallel with the brake B2 that establishes the first speed change step (1st), there is no need to engage the brake B2 at the time of takeoff (the time of acceleration). The speed change ratios of the speed change steps are appropriately determined by the gear ratios ρ1, ρ2, ρ3 of the first planetary gear device 12, the second planetary gear device 16 and the third planetary gear device 18.

Figure 3:
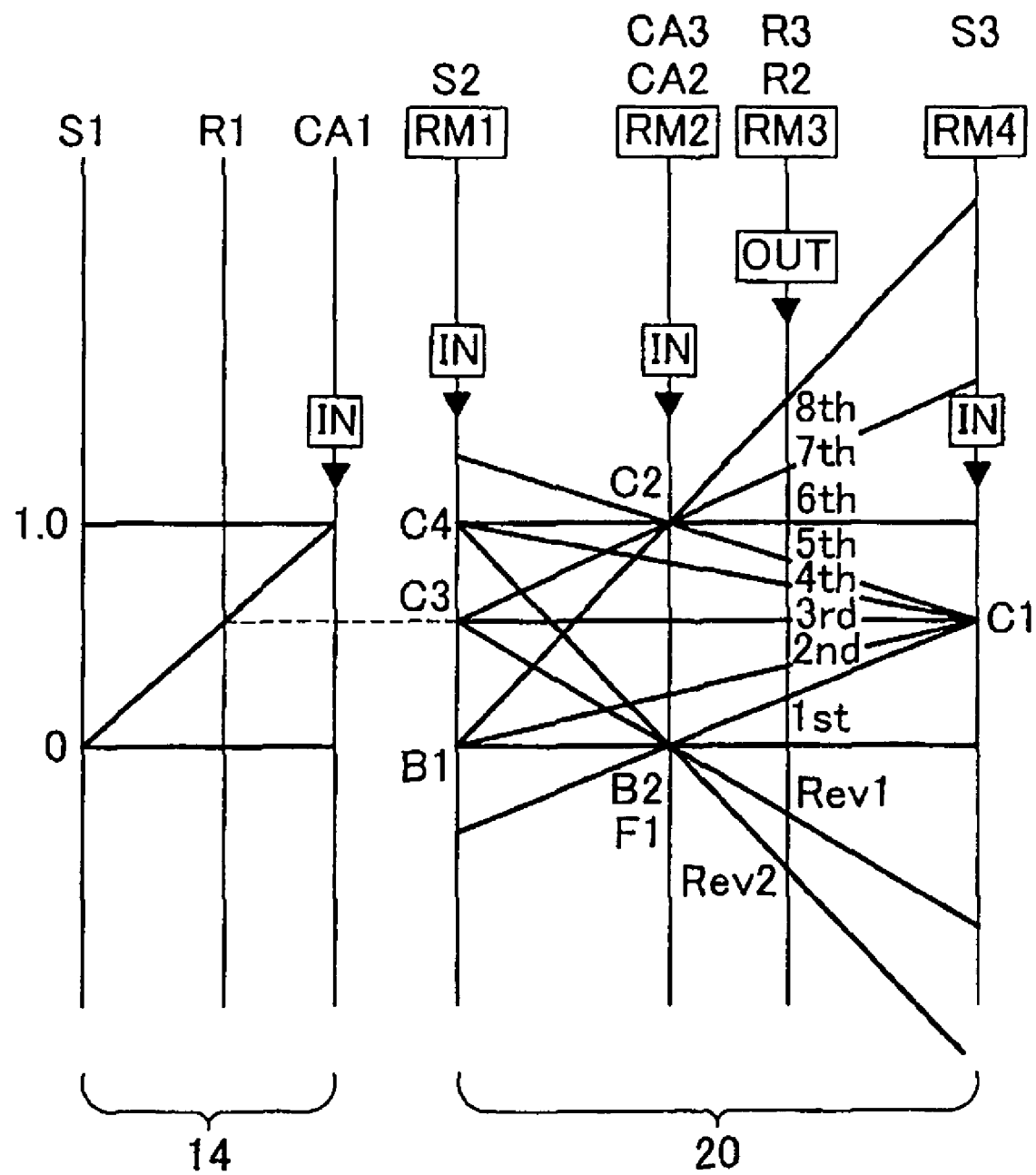
FIG. 3 is an alignment chart in which the rotation speeds of the rotating elements of a first speed changer portion and a second speed changer portion provided in the automatic transmission shown in FIG. 1 can be represented by straight lines.

FIG. 3 is an alignment chart in which the rotation speeds of the rotating elements of the first speed changer portion 14 and the second speed changer portion 20 can be represented by straight lines, wherein a lower horizontal line indicates a rotation speed of "0", and the upper horizontal line indicates a rotation speed of "1.0", that is, the same rotation speed as that of the input shaft 22. The vertical lines for the first speed changer portion 14 represent the sun gear S1, the ring gear R1 and the carrier CA1 in that order from the left. The intervals therebetween are determined in accordance with the gear ratio ρ1 (=the number of teeth of the sun gear S1/the number of teeth of the ring gear R1). The four vertical lines for the second speed changer portion 20 represent the first rotating element RM1 (the sun gear S2), the second rotating element RM2 (the carrier CA2 and the carrier CA3), the third rotating element RM3 (the ring gear R2 and the ring gear R3), and the fourth rotating element RM4 (the sun gear S3) in that order from the left side to the right end. The intervals therebetween are determined in accordance with the gear ratio ρ2 of the second planetary gear device 16 and the gear ratio ρ3 of the third planetary gear device 18.

As shown in FIGS. 2 and 3, when the first clutch C1 and the second brake B2 are engaged, the fourth rotating element RM4 is rotated at a reduced speed relative to the input shaft 22 via the first speed changer portion 14, and the second rotating element RM2 is stopped from rotating. Therefore, the third rotating element RM3 coupled to the output shaft 24 is rotated at a rotation speed shown by "1st", thus establishing a first speed change step "1st" that has a greatest speed change ratio (=the rotation speed of the input shaft 22/the rotation speed of the output shaft 24).

Besides, when the first clutch C1 and the first brake B1 are engaged, the fourth rotating element RM4 is rotated at a reduced speed relative to the input shaft 22 via the first speed changer portion 14, and the first rotating element RM1 is stopped from rotating. Therefore, the third rotating element RM3 is rotated at a rotation speed shown by "2nd", thus establishing a second speed change step "2nd" that has a smaller speed change ratio than the first speed change step "1st".

Besides, when the first clutch C1 and the third clutch C3 are engaged, the fourth rotating element RM4 and the first rotating element RM1 are rotated at a reduced speed relative to the input shaft 22 via the first speed changer portion 14, and the second speed changer portion 20 is rotated as an integral unit. Therefore, the third rotating element RM3 is rotated at a rotation speed shown by "3rd", thus establishing a third speed change step "3rd" that has a smaller speed change ratio than the second speed change step "2nd".

Besides, when the first clutch C1 and the fourth clutch C4 are engaged, the fourth rotating element RM4 is rotated at a reduced speed relative to the input shaft 22 via the first speed changer portion 14, and the first rotating element RM1 is rotated integrally with the input shaft 22. Therefore, the third rotating element RM3 is rotated at a rotation speed shown by "4th", thus establishing a fourth speed change step "4th" that has a smaller speed change ratio than the third speed change step "3rd".

Besides, when the first clutch C1 and the second clutch C2 are engaged, the fourth rotating element RM4 is rotated at a reduced speed relative to the input shaft 22 via the first speed changer portion 14, and the second rotating element RM2 is rotated integrally with the input shaft 22. Therefore, the third rotating element RM3 is rotated at a rotation speed shown by "5th", thus establishing a fifth speed change step "5th" that has a smaller speed change ratio than the fourth speed change step "4th".

Besides, when the second clutch C2 and the fourth clutch C4 are engaged, the second speed changer portion 20 is rotated integrally with the input shaft 22. Therefore, the third rotating element RM3 is rotated at a rotation speed shown by "6th", that is, a rotation speed equal to the rotation speed of the input shaft 22, thus establishing a sixth speed change step "6th" that has a smaller speed change ratio than the fifth speed change step "5th". The speed change ratio of the sixth speed change step "6th" is 1.

Besides, when the second clutch C2 and the third clutch C3 are engaged, the first rotating element RM1 is rotated at a reduced speed relative to the input shaft 22 via the first speed changer portion 14, and the second rotating element RM2 is rotated integrally with the input shaft 22. Therefore, the third rotating element RM3 is rotated at a rotation speed shown by "7th", thus establishing a seventh speed change step "7th" that has a smaller speed change ratio than the sixth speed change step "6th".

Besides, when the second clutch C2 and the first brake B1 are engaged, the second rotating element RM2 is rotated integrally with the input shaft 22, and the first rotating element RM1 is stopped from rotating. Therefore, the third rotating element RM3 is rotated at a rotation speed shown by "8th", thus establishing an eighth speed change step "8th" that has a smaller speed change ratio than the seventh speed change step "7th".

Besides, when the third clutch C3 and the second brake B2 are engaged, the first rotating element RM1 is rotated at a reduced speed via the first speed changer portion 14, and the second rotating element RM2 is stopped from rotating. Therefore, the third rotating element RM3 is reversely rotated at a rotation speed shown by "Rev1", thus establishing a first reverse speed change step that has a greatest speed change ratio in the reverse direction. Besides, when the fourth clutch C4 and the second brake B2 are engaged, the first rotating element RM1 is rotated integrally with the input shaft 22, and the second rotating element RM2 is stopped from rotating. Therefore, the third rotating element RM3 is reversely rotated at a rotation speed shown by "Rev2", thus establishing a second reverse speed change step "Rev2" that has a smaller speed change ratio than the first reverse speed change step "Rev1". The first reverse speed change step "Rev1" and the second reverse speed change step "Rev2" correspond to the first speed change step and the second speed change step, respectively, in the reverse direction.

Thus, the automatic transmission 10 of the first embodiment establishes a plurality of gear steps of different gear ratios by selectively engaging a plurality of engagement elements, that is, the clutches C1 to C4, and the brakes B1, B2. In addition, the eight forward speed-change gear steps are achieved by the first speed changer portion 14 that has the two intermediate output paths PA1 and PA2 of different speed change ratios and the second speed changer portion 20 that has the two planetary gear devices 16, 18, through the engagement switch between the four clutches C1 to C4 and the two brakes B1, B2. Therefore, the automatic transmission 10 is constructed in a small size, and is improved in the vehicle installability. Besides, as is apparent from the operation table of FIG. 2, the speed change steps can be shifted by so-called clutch-to-clutch shifting, that is, engagement switch between two of the clutches C1 to C4 and the brakes B1, B2. Besides, the clutches C1 to C4 and the brakes B1, B2 (hereinafter, simply referred to as "clutches C" and "brakes B" if not particularly distinguished) are hydraulic friction engagement devices that are engaged and controlled by hydraulic actuators such as multi-plate clutches or brakes.

Figure 4:
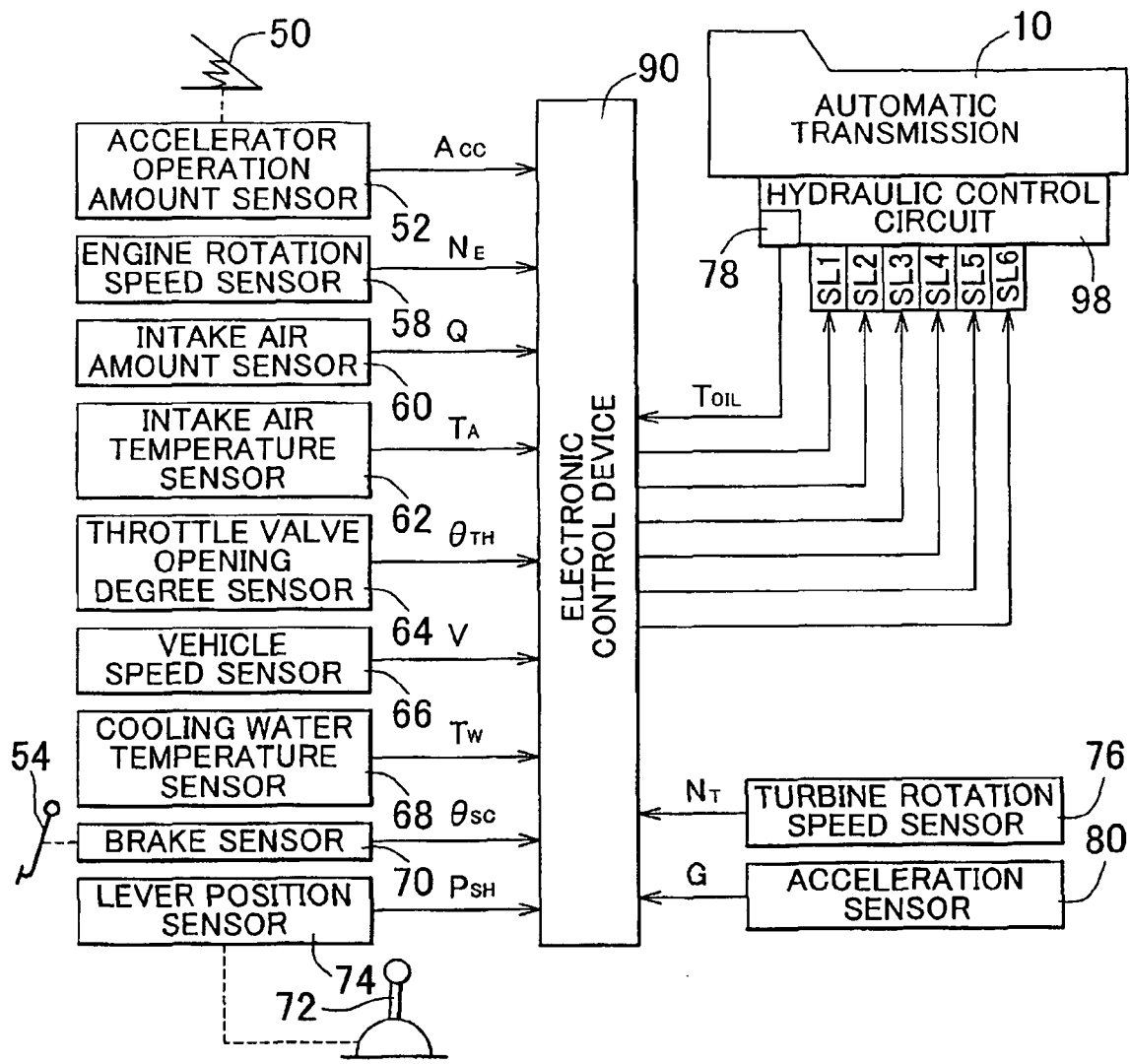

FIG. 4 is a block diagram illustrating portions of a control system provided for controlling the automatic transmission 10 and the like. An electronic control device 90 shown in FIG. 4 includes a so-called microcomputer having a CPU, a ROM, a RAM, an input/output interface, etc. By performing signal processing in accordance with programs stored in the ROM while using the temporary storage function of the RAM, the electronic control device 60 performs an output control of the engine 30, a shift control of the automatic transmission 10, etc. The electronic control device 90 is formed of separate sections for the engine control, for the shift control, etc. in accordance with needs.

In FIG. 4, the amount of operation Acc of an accelerator pedal 50 is detected by an accelerator operation amount sensor 52, and a signal representing the accelerator operation amount Acc is supplied to the electronic control device 90. The accelerator pedal 50, which is depressed corresponding to the driver's requested output amount, corresponds to an accelerator operating member, and the accelerator operation amount Acc corresponds to the requested output amount. Besides, a signal representing the depression amount $\theta_{SC}$ of a brake pedal 54 of a foot brake that is a service brake is supplied to the electronic control device 90. The brake pedal 54, which is depressed corresponding to the driver's requested deceleration amount, corresponds to a brake operating member, and the depression amount $\theta_{SC}$ thereof corresponds to the brake operation amount.

Furthermore provided are an engine rotation speed sensor 58 for detecting the rotation speed NE of the engine 30, an intake air amount sensor 60 for detecting the intake air amount Q of the engine 30, an intake air temperature sensor 62 for detecting the temperature $T_A$ of intake air, an idle switch-equipped throttle valve opening degree sensor 64 for detecting a fully closed state of an electronic throttle valve of the engine 30 and the degree of opening $\theta_{TH}$ thereof, a vehicle speed sensor 66 for detecting the vehicle speed V (corresponding to the rotation speed $N_{OUT}$ of the output shaft 24), a cooling water temperature sensor 68 for detecting the cooling water temperature $T_W$ of the engine 30, a brake sensor 70 for detecting the presence/absence of operation or the depression amount $\theta_{SC}$ of the brake pedal 54, a lever position sensor 74 for detecting the lever position (operation position) $P_{SH}$ of a shift lever 72, a turbine rotation speed sensor 76 for detecting the turbine rotation speed $N_T$ (=the rotation speed $N_{IN}$ of the input shaft 22), an AT oil temperature sensor 78 for detecting the AT oil temperature $T_{OIL}$ that is the temperature of working oil within a hydraulic control circuit 98, an acceleration sensor 80 for detecting the acceleration (deceleration) G of the vehicle, etc. These sensors and switches and the like supply signals representing the engine rotation speed $N_E$, the intake air amount Q, the intake air temperature $T_A$, the throttle valve opening degree $\theta_{TH}$, the vehicle speed V, the engine cooling water temperature $T_W$, the presence/absence of brake operation or the depression amount $\theta_{SC}$ thereof, the lever position $P_{SH}$ of the shift lever 72, the turbine rotation speed $N_T$, the AT oil temperature $T_{OIL}$, the acceleration (deceleration) G of the vehicle, etc., to the electronic control device 90.

Figure 5:
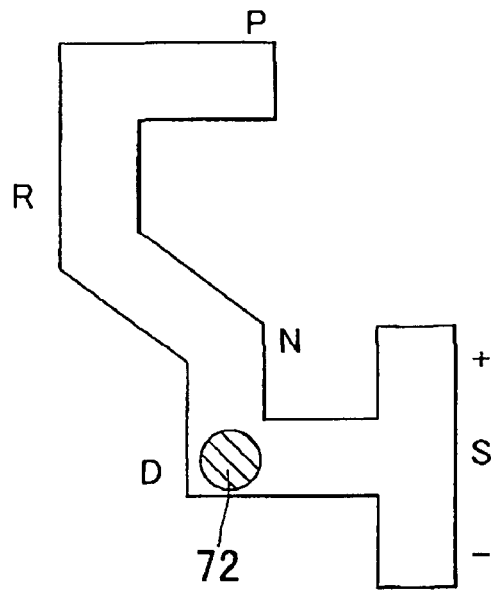
FIG. 5 is a diagram illustrating the operation positions of a shift lever shown in FIG. 4.

The shift lever 72 is disposed, for example, near the driver's seat, and is manually operated to one of five lever positions "P", "R", "N", "D" or "S" as shown in FIG. 5. The "P" position is a parking position that opens the power transmission path in the automatic transmission 10 and mechanically stops (locks) rotation of the output shaft 24 via a mechanical parking mechanism. The "R" position is a reverse run position that sets the rotational direction of the output shaft 24 of the automatic transmission 10 to the reverse rotation direction. The "N" position is a power transmission cutoff position that opens the power transmission path in the automatic transmission 10. The "D" position is a forward run position for the execution of an automatic shift control in a shift range (D range) that allows shift between speed change steps of the first speed to the eighth speed of the automatic transmission 10. The "S" position is a forward run position that allows manual shift by switching between a plurality of speed change steps or a plurality of shift ranges that are different in terms of the shiftable high speed-side speed change step. The "S" position is provided with a "+" position for shifting the range of shift or the speed change step to the up-side every time the shift lever 72 is operated to the position, and a "−" position for shifting the range of shift or the speed change step to the down-side every time the shift lever 72 is operated to the position. The lever position sensor 74 detects at which one of the lever positions (operation positions) $P_{SH}$ the shift lever 72 is positioned.

The hydraulic control circuit 98 is provided with, for example, a manual valve that is coupled to the shift lever 72 via a cable, a link, etc. As the shift lever 72 is operated, the manual valve is mechanically operated so as to switch hydraulic circuits in the hydraulic control circuit 98. For example, when the shift lever 72 is at the "D" position or the "S" position, a forward-travel oil pressure PD is output to mechanically establish a forward-travel circuit, thus making it possible to run the vehicle forward while shifting among the first speed change step "1st" to the eighth speed change step "8th", which are the forward speed change steps. When the shift lever 72 is operated to the "D" position, the electronic control device 90 judges that the shift lever 72 has been so operated, from the signal from the lever position sensor 74, and establishes an automatic shift mode, in which shift control is performed using all the forward speed change steps, that is, the first speed change step "1st" to the eighth speed change step "8th".

Figure 6:
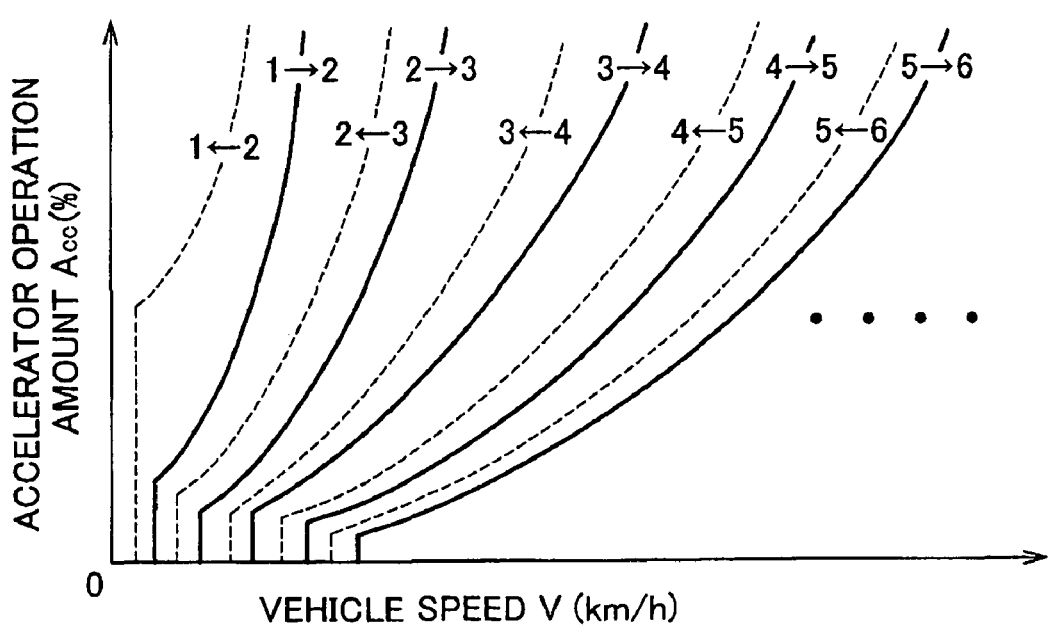
FIG. 6 is a diagram showing an example of a shift chart used in the shift control of the automatic transmission that is applied in the first embodiment and the second embodiment.

The electronic control device 90 functionally includes a shift control device 100 (see FIG. 8) that makes a shift judgment on the basis of the actual vehicle speed V and the actual accelerator operation amount Acc from a pre-stored relationship (a map, a shift chart) in which the vehicle speed V and the accelerator operation amount Acc are used as parameters as shown in FIG. 6, and carrying out shift control so as to attain the speed change step based on the judgment. For example, lower speed-side speed change steps with greater speed change ratios are established as the vehicle speed V decreases or as the accelerator operation amount Acc increases. In this shift control, the excitation and deexcitation and the electric current control of the linear solenoid valves SL1 to SL6 in the shift-purpose hydraulic control circuit 98 are executed to switch the engaged and released states of the clutches C and the brakes B and to control the transitional oil pressure during the shift process, and the like so that the speed change step based on the shift judgment is established. That is, by controlling the excitation and deexcitation of each linear solenoid valve SL1 to SL6, the engaged and released states of the clutches C1 to C4 and the brakes B1, B2 are switched so as to establish one of the first speed change step "1st" to the eighth speed change step "8th". Incidentally, various fashions of control are possible; for example, the shift control is performed on the basis of the throttle valve opening degree θTH, the intake air amount θ, the road surface inclination, etc.

In the shift chart of FIG. 6, each solid line is a shift line for judging an upshift (an upshift line), and each dashed line is a shift line for judging a downshift (a downshift line). The shift lines in the shift chart of FIG. 6 are for judging whether or not the actual vehicle speed V has crossed a horizontal line that indicates the actual accelerator operation amount Acc (%), that is, whether or not the value (shift point vehicle speed) VS on the shift line at which the shift should be executed has been exceeded. Each shift line is pre-stored as a series of such values VS, that is, a train of such shift point vehicle speeds. Incidentally, the shift chart of FIG. 6 exemplifies the shift lines of the first speed change step to the sixth speed change step of the first to eighth speed change steps for which shift is executed by the automatic transmission 10.

Figure 7:
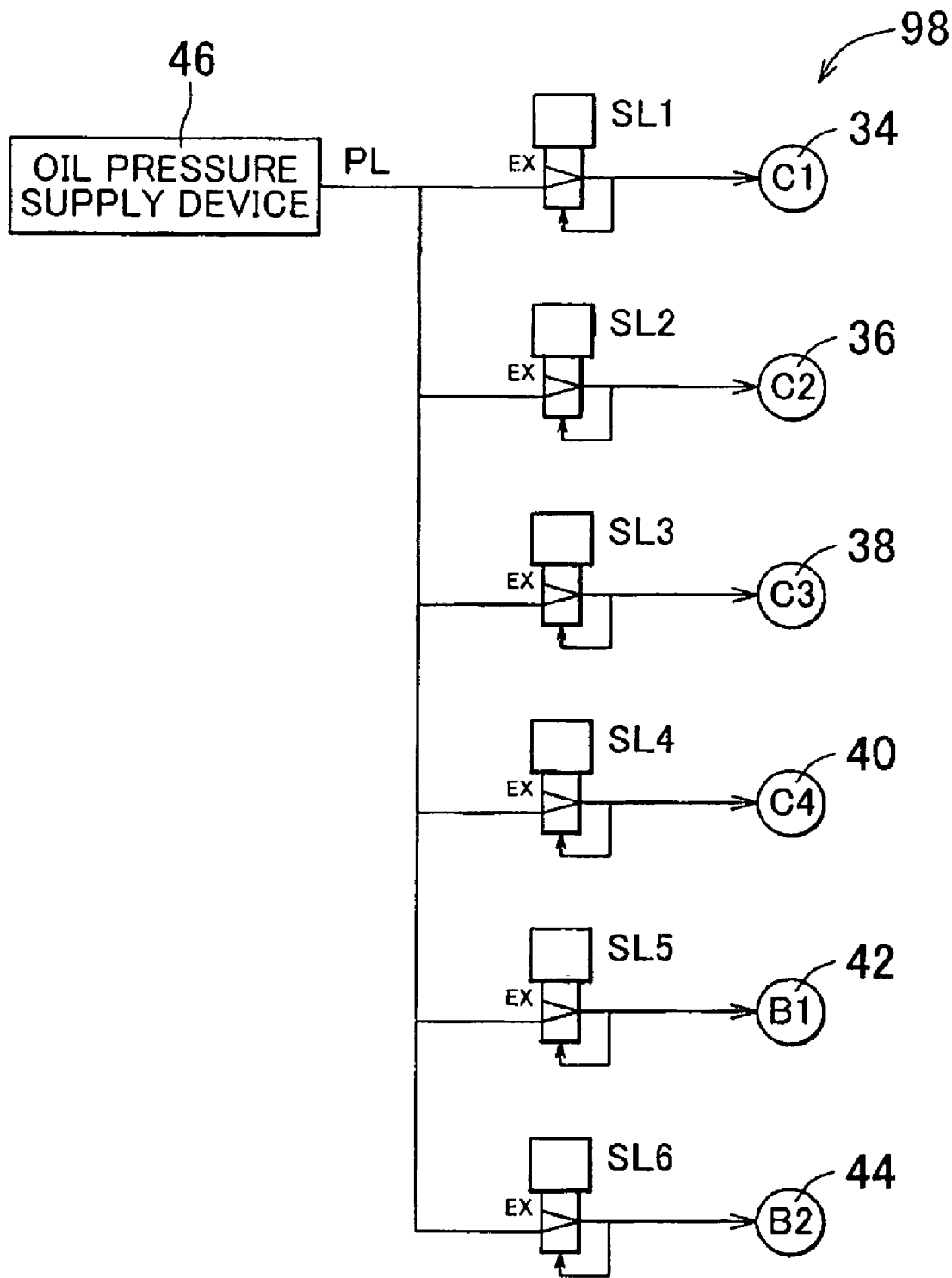
FIG. 7 is a diagram illustrating portions of a hydraulic control circuit shown in FIG. 4.

FIG. 7 is a circuit diagram showing portions of the hydraulic control circuit 98 that are related to the linear solenoid valves SL1 to SL6. That is, a construction is provided in which hydraulic actuators (hydraulic cylinders) 34, 36, 38, 40, 42, 44 of the clutches C1 to C4 and the brakes B1, B2 are supplied with the line oil pressure PL that is output by an oil pressure supply device 46 and is regulated by the linear solenoid valves SL1 to SL6. The oil pressure supply device 46 has a mechanical oil pump 48 (see FIG. 1) that is rotationally driven by the engine 30, a regulator valve that regulates the line oil pressure PL, etc., and controls the line oil pressure PL in accordance with the engine load, and the like. The linear solenoid valves SL1 to SL6 basically have the same construction, and each of the valves is independently excited and deexcited by the electronic control device 90 (see FIG. 4) to regulate and control the oil pressure of a corresponding one of the hydraulic actuators 34 to 44. In the shift control of the automatic transmission 10, for example, a so-called clutch-to-clutch shift in which the release and the engagement of the clutches C or brakes B involved the shift are simultaneously controlled is executed. For example, in a 5th speed→4th speed downshift, the clutch C2 is released and, at the same time, the clutch C4 is engaged as shown in the engagement operation table of FIG. 2, and the release transitional oil pressure of the clutch C2 and the engagement transitional oil pressure of the clutch C4 are appropriately controlled so as to restrain the shift shock.

Figure 8:
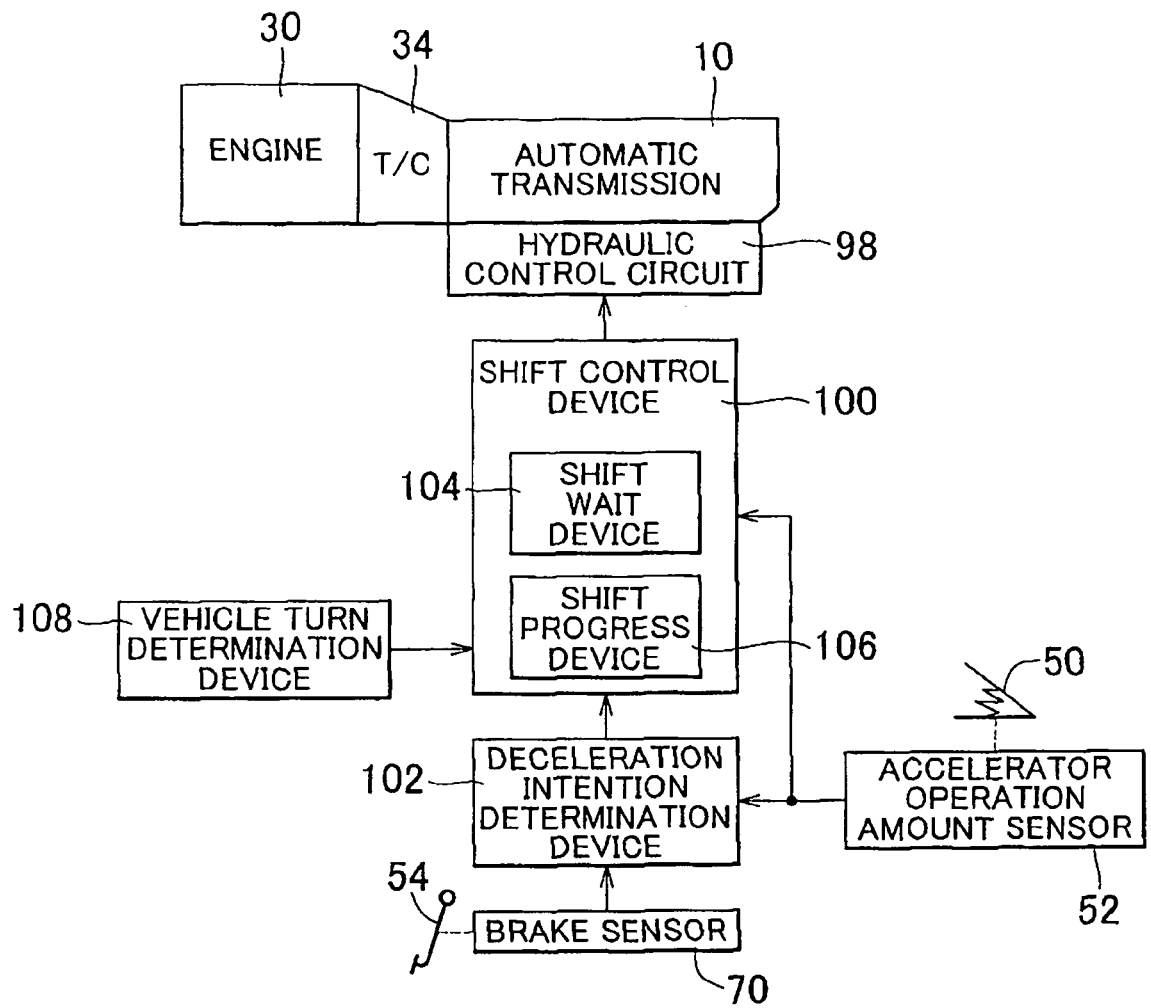
FIG. 8 is a functional block diagram illustrating portions of a control function of an electronic control device shown in FIG. 4, that is, a control operation at the time of a downshift during a coasting run.

FIG. 8 is a functional block diagram illustrating portions of a control function of the electronic control device 90, that is, a control operation at the time of a downshift during a coasting run (hereinafter, referred to as "coast downshift control operation"). The shift control device 100 shown in FIG. 8 automatically switches gear steps of the automatic transmission 10, for example, by executing a shift judgment on the basis of the actual vehicle speed V and the actual accelerator operation amount Acc from a pre-stored shift chart as shown in FIG. 6, and giving a shift output for executing the shift based on the judgment to the hydraulic control circuit 98. For example, if during a coasting run with the speed change step of the automatic transmission 10 being set at the third speed change step, the shift control device 100 judges that the actual vehicle speed V has exceeded a shift point vehicle speed V3-2 at which a 3rd speed→2nd speed downshift with the accelerator operation amount Acc being null is to be executed, the shift control device 100 outputs to the hydraulic control circuit 98 a command to perform an operation in which the release of the clutch C3 is started, and while a certain amount of the engagement torque of the clutch C3 is maintained, the engagement of the brake B1 is started so as to generate engagement torque thereof, and in this state, the speed change ratio γ is changed from the speed change ratio γ3 of the third speed change step to the speed change ratio γ2 of the second speed change step, thus completing the release of the clutch C3 and the engagement of the brake B1.

A deceleration intention determination device 102 determines whether or not there is a driver's intention to decelerate the vehicle at the time of the shift control by the shift control device 100. This determination is repeatedly executed on a predetermined time cycle during the coast downshift. In this determination, if it is determined that a brake operation has been performed, it is determined that there is a driver's intention to decelerate the vehicle. Preferably, it is determined that there is no longer a driver's intention to decelerate the vehicle, if it is determined that there exists any one of the following situations: (a) a brake operation has discontinued; (b) an accelerator operation has been performed; and (c) the discontinuing rate of the brake operation amount is greater than or equal to a predetermined value. The determination regarding the situation (a) is performed on the basis of the on/off status of a brake contact point signal of the foot brake detected via the brake sensor 70, the brake master cylinder pressure (not shown), etc. If the brake contact point signal is turned off, or if the brake master cylinder pressure has become less than or equal to a predetermined value, it is determined that the brake operation has discontinued. The determination regarding the situation (b) is performed on the basis of the operation amount Acc of the accelerator pedal 54 detected via the acceleration operation amount sensor 52, or the like. If the accelerator operation amount Acc is not null, that is, if the engine 30 is not in the idle state, it is determined that accelerator operation has been performed. The determination regarding the situation (c) is performed on the basis of the rate of change (amount of change in the predetermined time) of the depression amount $\theta_{SC}$ of the foot brake detected via the brake sensor 70, the rate of change of the brake master cylinder pressure (not shown), etc. If the rate of change of the depression amount $\theta_{SC}$ has become less than or equal to a predetermined value, of it the rate of change of the brake master cylinder pressure has become less than or equal to a predetermined value, it is determined that the discontinuing rate of the brake operation amount is greater than or equal to the predetermined value. It is also allowable to perform determination regarding only one of the situations (a), (b) and (c) and to determine that there is no longer a driver's intention to decelerate the vehicle depending on the determination.

In the first embodiment, the shift control device 100 includes a shift wait device 104 and a shift progress device 106. The shift wait device 104 stops the rise of the engagement pressure of the engagement-side engagement element so as to cause the shift not to progress, if the deceleration intention determination device 102 makes an affirmative determination, that is, determines that there is a driver's intention to decelerate the vehicle. Herein, the engagement-side engagement element refers to one of hydraulic friction engagement devices that is engaged (newly engaged) in a clutch-to-clutch shift in each coast downshift. In the automatic transmission 10 of the first embodiment, the engagement-side engagement element corresponds to the clutch C3 in the 8th speed→7th speed downshift, the clutch C4 in the 7th speed→6th speed downshift, the clutch C1 in the 6th speed→5th speed downshift, the clutch C4 in the 5th speed→4th speed downshift, the clutch C3 in the 4th speed→3rd speed downshift, the brake B1 in the 3rd speed→2nd speed downshift, and the brake B2 in the 2nd speed→1st speed downshift. That is, the in the first embodiment, the shift wait device 104 stops the rise of the engagement-side oil pressure supplied to the hydraulic friction engagement device on the engagement side via the hydraulic control circuit 98 to cause the shift not to progress, if the deceleration intention determination device 102 makes an affirmative determination. Incidentally, in the 2nd speed→1st speed downshift, this control of the engagement pressure is not performed since the one-way clutch F1 provided side by side with the brake B2 works.

The shift progress device 106 causes the shift to progress by raising the engagement pressure of the engagement-side engagement element again if the deceleration intention determination device 102 makes a negative determination, that is, determines that there is not a driver's intention to decelerate the vehicle, in the case where the rise of the engagement pressure has been stopped by the shift wait device 104. In the first embodiment, if the deceleration intention determination device 102 makes a negative determination, the engagement-side oil pressure supplied to the hydraulic friction engagement device on the engagement side via the hydraulic control circuit 98 is raised again to cause the shift to progress, that is, a well-known coast downshift is executed.

A vehicle turn determination device 108 shown in FIG. 8 determines whether or not the vehicle is in a turning state (in a turning run). Preferably, the vehicle turn determination device 108 determines whether or not the vehicle is in the turning state on the basis of whether or not the steer angle of the steering wheel or a road wheel detected by a sensor (not shown), the lateral acceleration (lateral G), the curvature of the corner, on the like has exceeded a predetermined criterion value. Besides, preferably, it is determined that the vehicle is turning, if when there is tendency toward acceleration, the speed of return of the accelerator, except the tip-in operation, is greater than or equal to a predetermined value or the deceleration at the time of braking is greater than or equal to a predetermined value. Therefore, a pre-corner run and an in-corner run of the vehicle are determined without the provision of a detection device such as a steer angle sensor or the like. Incidentally, although the vehicle turn determination device 108 may simply determine whether or not the vehicle is in the turning state, various other fashions are conceivable; for example, it is determined whether or not the amount of turn of the vehicle is within a predetermined range, or the like.

Preferably, the shift wait device 104 performs the above-described control of causing the shift not to progress by stopping the rise of the engagement-side oil pressure supplied to the hydraulic friction engagement device on the engagement side on the condition that the vehicle turn determination device 108 have made a negative determination, that is, the vehicle be not in the turning state. In other words, the shift progress device 106 causes the shift to progress by raising the engagement-side oil pressure supplied to the hydraulic friction engagement device on the engagement side again if the vehicle turn determination device 108 makes an affirmative determination, that is, if the vehicle is in the turning state.

Figure 9:
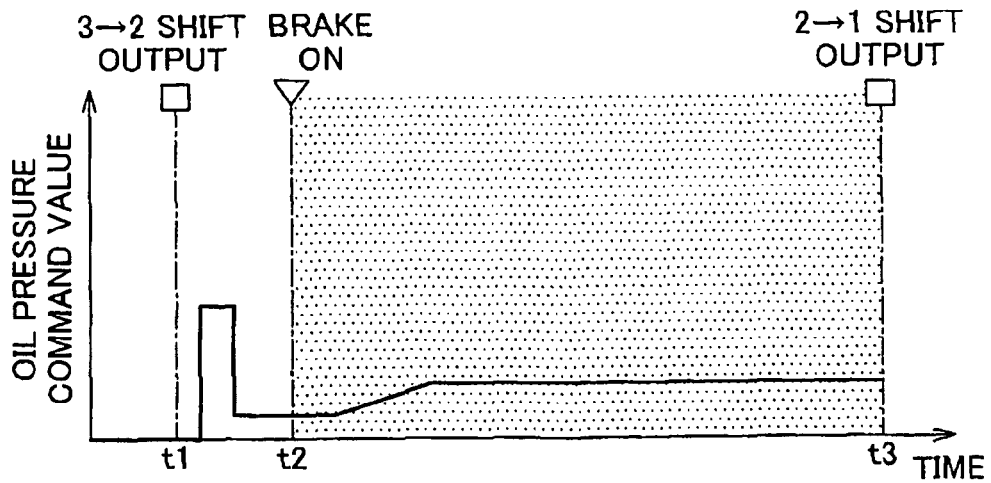
FIG. 9 is a time chart illustrating an oil pressure command value corresponding to the hydraulic friction engagement device on the engagement side in the 3rd speed→2nd speed downshift, as an example of the coast downshift control operation by the electronic control device shown in FIG. 4, showing an example in which the 3rd speed→1st speed downshift is performed without the intervention of the 2nd speed.
Figure 10:
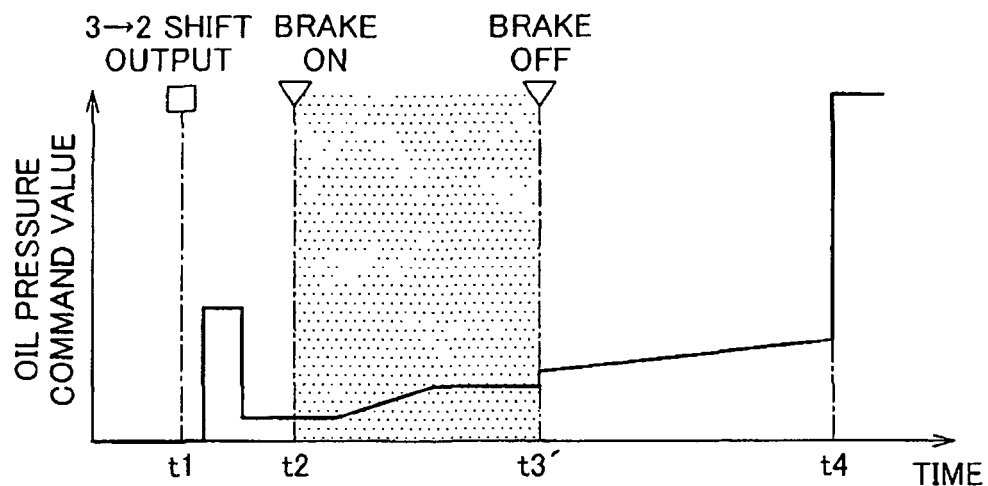
FIG. 10 is a time chart illustrating the oil pressure command value corresponding to the hydraulic friction engagement device on the engagement side in the 3rd speed→2nd speed downshift, as an example of the coast downshift control operation by the electronic control device shown in FIG. 4, showing an example in which the driver's intention to decelerate the vehicle disappears during the shift and re-acceleration is performed.

FIG. 9 and FIG. 10 are time charts illustrating the oil pressure command value corresponding to the brake B1, that is, the hydraulic friction engagement device on the engagement side in the 3rd speed→2nd speed downshift, as an example of the coast downshift control operation in the first embodiment. FIG. 9 shows an example in which the 3rd speed→1st speed downshift is performed without the intervention of the 2nd speed, and FIG. 10 shows an example in which the driver's intention to decelerate the vehicle disappears during the shift and re-acceleration is performed. The oil pressure command value shown in FIGS. 9 and 10 is a command value for controlling the state of engagement of the brake B1 via the linear solenoid valve SL5 provided in the hydraulic control circuit 98, and corresponds one-to-one to the engagement pressure of the brake B1.

In the time chart shown in FIG. 9, firstly at time point t1, the shift control device 100 determines a start of the 3rd speed→2nd speed downshift (shift output). When the supply of working oil to the brake B1 is started, a so-called fast-fill control is executed to rapidly raise the amount of flow of working oil that is output from an output port of the linear solenoid valve SL5. Next, if at time point t2, an operation of the foot brake is detected by the brake sensor 70 and it is determined that the present state is a state where the deceleration intention determination device 102 makes an affirmative determination, that is, a state where there is a driver's intention to decelerate the vehicle, then a control is performed such that the engagement-side oil pressure supplied to the brake B1 via the linear solenoid valve SL5 is raised to a predetermined pressure, and then the rise in pressure is stopped and the pressure is maintained so that the shift will not further progress. Then, if at time point t3, the shift control device 100 determines a start of the 2nd speed→1st speed downshift (shift output), the engagement oil pressure of the brake B1 is brought to null via the linear solenoid valve SL5, thereby releasing the brake B1. That is, the 3rd speed→2nd speed downshift is not performed between the time points t1 and t3, but the 3rd speed→1st speed downshift is performed without the intervention of the 2nd speed. Incidentally, the control is performed not only in the case where a brake operation is performed by the driver (time point t2) after the shift output is started (time point t1), but is similarly performed in the case where a brake operation by the driver has begun prior to time point t1 when the 3rd speed→2nd speed downshift is determined.

Figure 11:
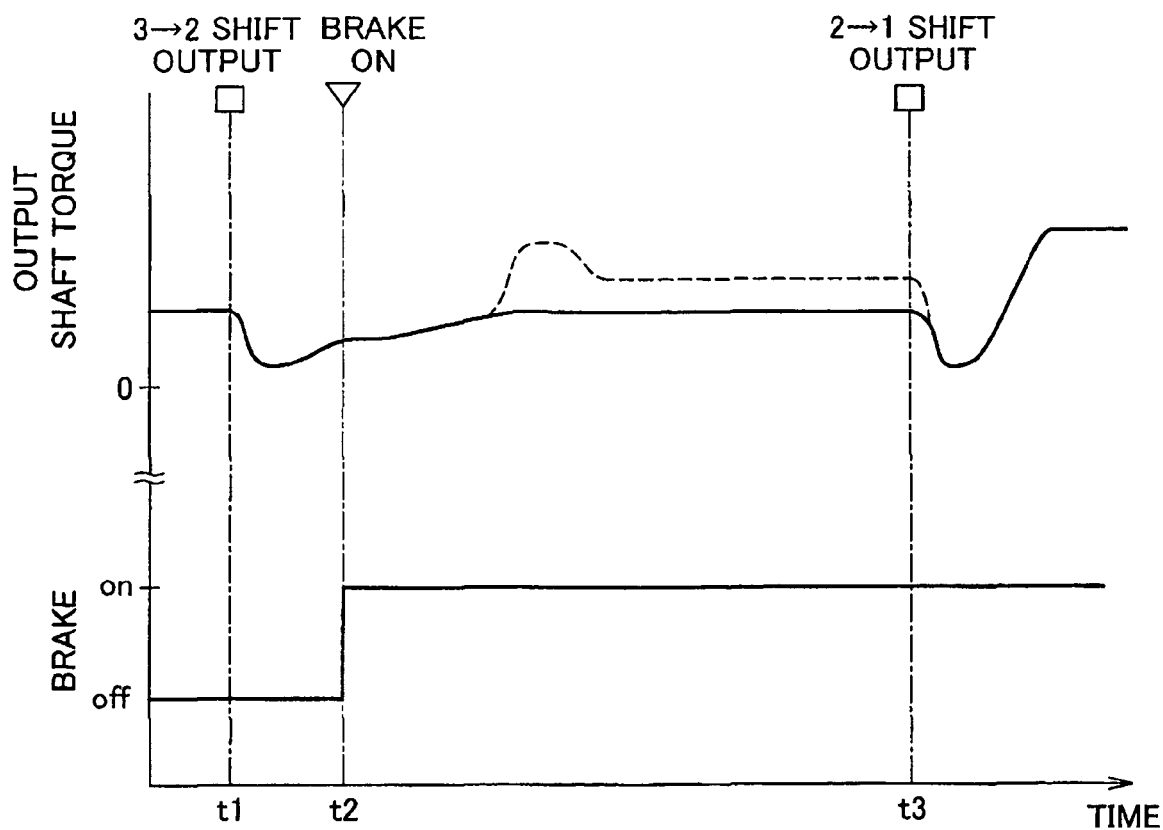
FIG. 11, corresponding to the time chart of FIG. 9, is a time chart showing the output shaft torque and the on/off state of the brake, and in which the output shaft torque based on the control of the invention is shown by a solid line and the output shaft torque based on the related-art control in which the rise of the engagement pressure of the hydraulic friction engagement device on the engagement side is not stopped is shown by a dotted line.

FIG. 11 is a time chart showing the torque of the output shaft 24 and the on/off state of the foot brake, corresponding to the time chart of FIG. 9. In FIG. 11, the output shaft torque based on the control of the first embodiment is shown by a solid line, and the output shaft torque based on the related-art control in which the rise of the engagement pressure of the brake B1 is not stopped is shown by a dotted line. As shown by the dotted line in FIG. 11, according to the related-art control in which at the time of the 3rd speed→2nd speed coast downshift, the rise of the engagement pressure of the brake B1 is not stopped even in the case where a brake operation of the foot brake has been performed by the driver, the brake B1 is completely engaged and therefore the 3rd speed→2nd speed downshift is completed between the time points t2 and t3. After the time point of the completion of the shift, the second speed change step is maintained. In association with this shift, the output shaft torque relatively sharply rises as shown in FIG. 11, and therefore, there is a possibility of occurrence of a shift shock. Then, when at time point t3, the 2nd speed→1st speed downshift is output, the brake B1 is released to set the first speed change step. In association with the shift, the output shaft torque relatively sharply drops as shown in FIG. 11. Therefore, at this time, too, there is a possibility of occurrence of a shift shock. On the other hand, as shown by a solid line in FIG. 11, according to the control of the first embodiment in which at the time of the 3rd speed→2nd speed downshift, the rise of the engagement pressure of the brake B1 is stopped if there is a brake operation performed by the driver, a state where the 3rd speed→2nd speed downshift is not completed is maintained throughout the period between the time points t2 and t3. Then, when at time point t3 the 2nd speed→1st speed (3rd speed→1st speed) downshift is output, the brake B1 is released to set the first speed change step without the intervention of the second speed change step. In the control in accordance with the first embodiment, since the 3rd speed→2nd speed downshift is not completely performed between the time points t2 and t3, an unnecessary shift is omitted and, at the same time, a shift shock associated with that shift does not occur. Furthermore, it can be understood that in the 3rd speed→1st speed downshift at time point t3, the fluctuation of the output shaft torque is small as shown in FIG. 11, and the shift shock is more favorably restrained than in the related-art control.

In the time chart shown in FIG. 10, firstly, at time point t1, the shift control device 100 determines a start of the 3rd speed→2nd speed downshift (shift output). When the supply of working oil to the brake B1 is started, the so-called fast-fill control is executed to rapidly raise the amount of working oil that is output from the output port of the linear solenoid valve SL5. Next, if at time point t2, an operation of the foot brake is detected by the brake sensor 70 and it is determined that the present state is a state where the deceleration intention determination device 102 makes an affirmative determination, that is, a state where there is a driver's intention to decelerate the vehicle, then a control is performed such that the engagement-side oil pressure supplied to the brake B1 via the linear solenoid valve SL5 is raised to a predetermined pressure, and then the rise of the pressure is stopped and the pressure is maintained so that the shift will not further progress. Next, if at time point t3', release of the foot brake is detected by the brake sensor 70 and it is determined that the present state is a state where the deceleration intention determination device 102 makes a negative determination, that is, a state where there is not a driver's intention to decelerate the vehicle, the rise of the engagement-side oil pressure supplied to the brake B1 via the linear solenoid valve SL5 is started again. Then, at time point t4, the brake B1 is completely engaged, thereby completing the 3rd speed→2nd speed downshift. Incidentally, the control, as in the control shown in FIG. 9, is performed not only in the case where a brake operation is performed by the driver after the shift output is started, but is similarly performed in the case where a brake operation by the driver has begun prior to time point t1 when the 3rd speed→2nd speed downshift is determined.

As shown in FIG. 10, in the control of the first embodiment, the rise of the engagement pressure of the brake B1 is stopped so as to cause the shift not to progress, if the present state is a state where the deceleration intention determination device 102 makes an affirmative determination, that is, a state where it is determined that there is a driver's intention to decelerate the vehicle. On the other hand, if the deceleration intention determination device 102 makes a negative determination, that is, determines that there is not a driver's intention to decelerate the vehicle, during the state where the rise of the engagement pressure of the brake B1 has been stopped, the engagement pressure of the brake B1 is raised again to cause the shift to progress. In the downshift during the coasting run (coast), the coast downshift control for preparing for depression of the accelerator pedal so as to enable the vehicle to accelerate in good response by appropriate driving power when the vehicle is to be accelerated again is generally performed. However, if there continues to be a state where the deceleration intention determination device 102 makes an affirmative determination, that is, a state where it is determined that there is a driver's intention to decelerate the vehicle, the transition from the decelerating state to a stopped state of the vehicle is conceivable; therefore, the shift is stopped halfway through and is caused not to progress. Thus, the occurrence of a shift shock can be suitably restrained as stated above in conjunction with FIG. 11. On the other hand, if the state changes to a state where the deceleration intention determination device 102 makes a negative determination, that is, to a state where it is determined that there is not a driver's intention to decelerate the vehicle, the change to acceleration from the decelerating state of the vehicle is conceivable; therefore, the coast downshift is caused to progress so as to prepare for depression of the accelerator pedal so that the vehicle can be accelerated in good response by appropriate driving power. It is to be noted herein that in the control of the first embodiment, since the discontinuation of brake operation causes the shift to progress again, there is possibility of a downshift following the discontinuation of the brake operation. Since a shock perceived by a driver due to a brake-off operation resembles a shift shock, overlap of the shift shock with the shock caused by an intentional brake-off operation will achieve an advantage of restraining the driver from perceiving it as a shift shock.

Figure 12:
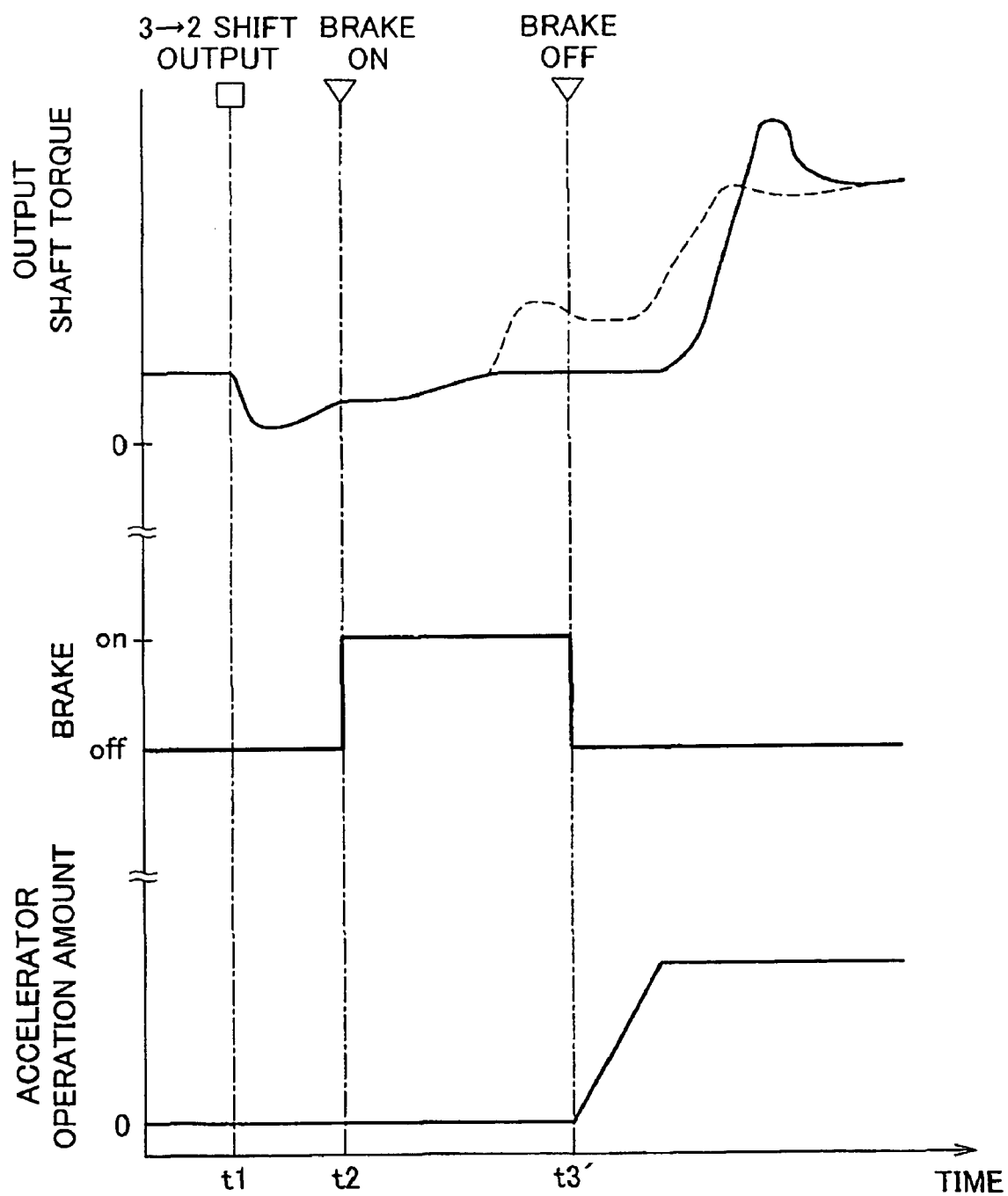
FIG. 12, corresponding to the time chart of FIG. 10, is a time chart showing the output shaft torque and the on/off state of the brake during a turning state of the vehicle, in which the output shaft torque based on the control of the invention is shown by a solid line and the output shaft torque based on the related-art control in which the rise of the engagement pressure of the hydraulic friction engagement device on the engagement side is not stopped is shown by a dotted line.

FIG. 12, corresponding to the time chart of FIG. 10, is a time chart showing the torque of the output shaft 24 and the on/off state of the brake during a turning state of the vehicle, in which the output shaft torque based on the control of the first embodiment is shown by a solid line and the output shaft torque based on the related-art control in which the rise of the engagement pressure of the brake B1 is not stopped is shown by a dotted line. While the vehicle is turning, there is high possibility of the accelerator pedal 50 being depressed to accelerate the vehicle immediately after brake operation is discontinued. In the case where the above-described control of the first embodiment is performed in which, for example, a brake operation causes the coast downshift control not to progress, and the discontinuation of the brake operation substantially simultaneously causes the coast downshift control to progress again, if the discontinuation of a brake operation is immediately followed by depression of the accelerator pedal 50 to accelerate the vehicle again, there is possibility of bringing about a characteristic that a shift shock occurs in a short time as shown by a solid line following time point t3' in FIG. 12. Therefore, in the first embodiment, the shift is caused to progress by raising the engagement-side oil pressure supplied to the brake B1 if the vehicle turn determination device 108 makes an affirmative determination, that is, if the vehicle is in a turning state. Due to this, as in the related-art control, the 3rd speed→2nd speed coast downshift is promptly completed, and a related shift shock can be restrained as shown by the dotted line in FIG. 12.

Figure 13:
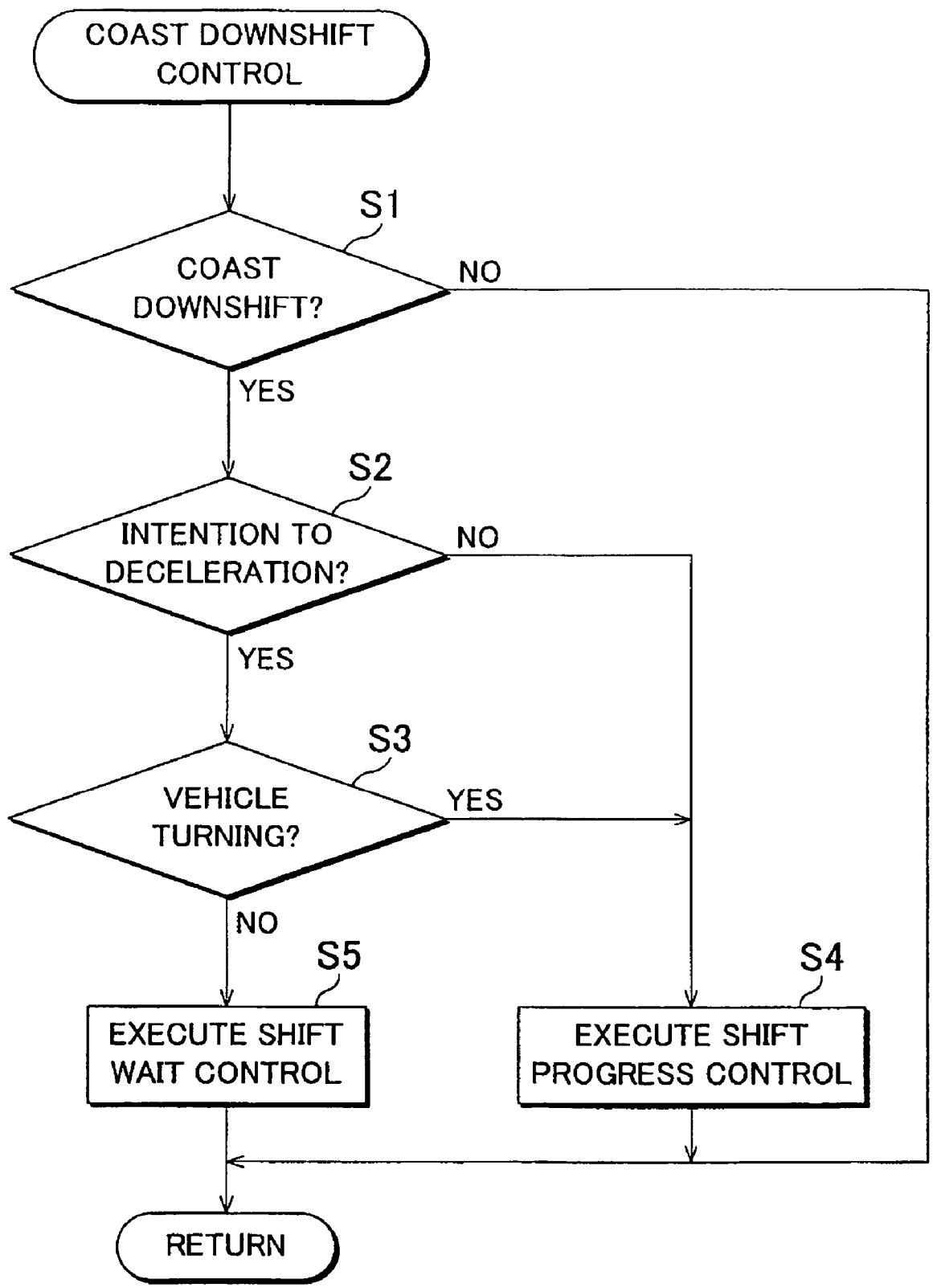
FIG. 13 is a flowchart illustrating portions of the coast downshift control performed by the electronic control device.

FIG. 13 is a flowchart illustrating portions of the coast downshift control performed by the electronic control device 90. The process shown in FIG. 13 is executed repeatedly on a predetermined cycle.

Firstly, in step (hereinafter, "step" will be omitted) S1, it is judged whether or not the present state is a state where a coast downshift is performed, that is, whether or not a downshift at the time of a coasting run (coast) is being presently performed. If a negative judgment is made in S1, this routine is therefore ended. However, if an affirmative judgment is made in S1, it is judged whether or not there is a driver's intention to decelerate the vehicle in S2, which corresponds to an action of the deceleration intention determination device 102. This judgment is made, for example, on the basis of the on/off state of a brake contact point signal of the foot brake detected via the brake sensor 70, the brake master cylinder pressure (not shown), or the like. That is, it is judged that there is a driver's intention to decelerate the vehicle, for example, if the brake contact point signal is on, or if the brake master cylinder pressure is greater than or equal to a predetermined value. Besides, if the brake contact point signal is off, or if the brake master cylinder pressure is less than or equal to a predetermined value, or if the operation amount Acc of the accelerator pedal 54 detected via the accelerator operation amount sensor 52 is not null, that is, the engine 30 is not in the idle state, it is judged that there is not a driver's intention to decelerate the vehicle. Furthermore, the judgment can also be made on the basis of the rate of change of the depression amount $\theta_{SC}$ of the foot brake detected via the brake sensor 70 or the rate of change of the brake master cylinder pressure (not shown), etc. That is, if the rate of change of the depression amount $\theta_{SC}$ is less than or equal to a predetermined value, or if the rate of change of the brake master cylinder pressure is less than or equal to a predetermined value, it is judged that the discontinuing rate of the brake operation is greater than or equal to a predetermined value, in which case it is judged that there is not a driver's intention to decelerate the vehicle. If a negative judgment is made in S2, that is, if it is judged that there is not a driver's intention to decelerate the vehicle, the process proceeds to S4, which corresponds to an action of the shift progress device 106. In S4, the coast downshift control is resumed by raising the engagement-side oil pressure supplied to the hydraulic friction engagement device on the engagement side via the hydraulic control circuit 98. After that, the routine is ended. If an affirmative judgment is made in S2, that is, if it is judged that there is a driver's intention to decelerate the vehicle, it is then judged whether or not the vehicle is in a turning state (turning), in S3 corresponding to an action of the vehicle turn determination device 108. For example, the judgment is made on the basis of whether or not the steer angle of the steering wheel or a road wheel detected by a sensor (not shown), the lateral acceleration (lateral G), the corner radius, or the like has exceeded a predetermined criterion value. If the criterion value is exceeded, it is judged that the vehicle is in the turning state. Besides, if when there is tendency toward acceleration, the speed of return of the accelerator, except the tip-in operation, is greater than or equal to a predetermined value or the deceleration at the time of braking is greater than or equal to a predetermined value, then it is judged that the vehicle is in the turning state. If an affirmative judgment is made in S3, the process of S4 and subsequent operation is executed. If a negative judgment is made in S3, the process proceeds to S5, which corresponds to an action of the shift wait device 104. In S5, the rise of the engagement-side oil pressure supplied to the hydraulic friction engagement device on the engagement side via the hydraulic control circuit 98 is stopped so as to cause the shift not to progress. After that, the routine is ended.

According to the first embodiment, the shift control device includes: the deceleration intention determination device 102 (S2) that determines whether or not there is a driver's intention to decelerate the vehicle during the coast downshift; the shift wait device 104 (S5) that stops the rise of the engagement pressure of the engagement-side engagement element so as to cause the shift not to progress, if the deceleration intention determination device 102 makes an affirmative determination; and the shift progress device 106 (S4) that raises again the engagement pressure of the engagement-side engagement element so as to cause the shift to progress, if the deceleration intention determination device 102 makes a negative determination during a state where the rise of the engagement pressure has been stopped by the shift wait device 104. Therefore, if there is a driver's intention to decelerate the vehicle, that is, if it is considered that there is an intention to change from the decelerating state to the stopped state, the shift control device causes the coast downshift not to progress, so that the occurrence of a shift shock due to an unnecessary coast downshift can be prevented. Furthermore, if the driver's intention to decelerate the vehicle has disappeared, the shift control device causes the shift to progress, so that the vehicle can be accelerated in good response when the vehicle is to be accelerated again from the decelerating state. That is, the shift control device of the vehicular automatic transmission 10 which reduces the shift shock while enabling the vehicle to accelerate in good response when the vehicle is to be accelerated again from a decelerating state can be provided.

The engagement elements are hydraulic friction engagement devices. The shift wait device 104 is a device that stops the rise of the engagement-side oil pressure supplied to the hydraulic friction engagement device on the engagement side so as to cause the shift not to progress, if the deceleration intention determination device 102 makes an affirmative determination. The shift progress device 106 is a device that causes the shift to progress again by raising the engagement-side oil pressure supplied to the hydraulic friction engagement device if the deceleration intention determination device 102 makes a negative determination. Therefore, in the practical vehicular automatic transmission 10 having a plurality of hydraulic friction engagement devices, the shift control device is able to reduce the shift shock while enabling the vehicle to accelerate in good response when the vehicle is to be accelerated again from a decelerating state.

Furthermore, the deceleration intention determination device 102 determines that there is no longer a driver's intention to decelerate the vehicle if it is determined that there exists any one of the situation that the brake operation has been discontinued, the situation that an accelerator operation has been performed, and the situation that the discontinuing rate of the brake operation amount is greater than or equal to a predetermined value. Therefore, the shift control device is able to suitably determine the presence/absence of a driver's intention to decelerate the vehicle.

Furthermore, the shift control device has the vehicle turn determination device 108 (S3) that determines whether or not the vehicle is in a turning state. The shift wait device 104 stops the rise of the engagement pressure of the engagement-side engagement element so as to cause the shift not to progress, on the condition that the vehicle turn determination device 108 make a negative determination. When the vehicle is turning, there is high possibility of accelerating the vehicle again immediately after performing a brake operation for the turn. Therefore, this operation suitably restrains deterioration of the acceleration performance at the time of re-acceleration during the turning of the vehicle.

While the first embodiment of the invention has been described in detail above with reference to the drawings, the invention can be carried out with various modifications without departing from the spirit of the invention.

For example, although in the first embodiment, the automatic transmission 10 is equipped with a plurality of hydraulic friction engagement devices, that is, the clutches C and the brakes B, as engagement elements for establishing a plurality of gear steps of different gear ratios through selective engagement thereof, the invention is not limited to this construction. For example, the automatic transmission may be equipped with electromagnetically controlled engagement elements, such as electromagnetic clutches, magnetic particle clutches, etc. In such a case, the shift wait device 104 and the shift progress device 106 control the engagement pressures of the engagement elements by controlling the command signals supplied to the engagement elements.

Furthermore, in conjunction with the first embodiment, a direct pressure control has been described in which a downshift is executed by directly controlling the release pressure of the hydraulic friction engagement device on the release side and the engagement pressure of the hydraulic friction engagement device on the engagement side through the use of the linear solenoid valves SL1 to SL6. However, the invention is suitably applicable not only to such a shift mechanism in which linear solenoid valves are provided corresponding to the individual hydraulic friction engagement devices, but also to a shift mechanism that employs a hydraulic control circuit of a control method that is other than the direct pressure control.

Furthermore, in conjunction with the first embodiment, a control that includes the 3rd speed→2nd speed downshift, and the 3rd speed→1st speed downshift performed without the intervention of the second speed change step, that is, a one-way-clutch shift, has been described as an example of the coast downshift. However, the invention is widely applied to coast downshifts performed by the engagement switch between the release-side engagement element and the engagement-side engagement element during deceleration of the vehicle. It goes without saying that the invention is suitably applicable also to the control of a clutch-to-clutch shift that does not include the one-way clutch shift.

Figures 14, 15:
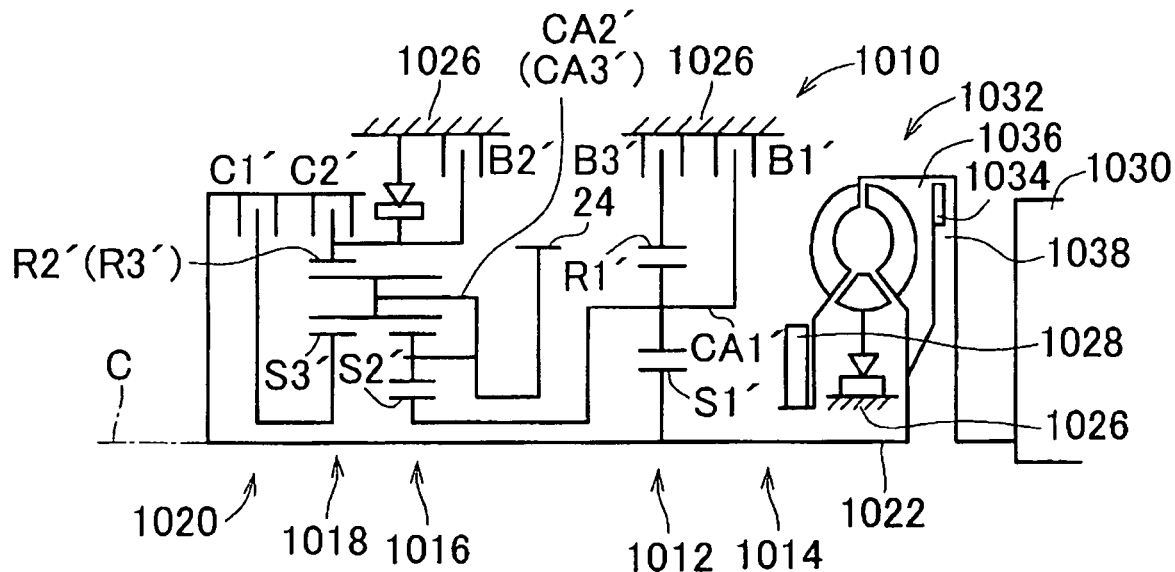
FIG. 14 is a skeleton diagram illustrating the construction of a vehicular automatic transmission that is applied to a second embodiment of the invention.
FIG. 15 is an operation table illustrating combinations of the states of operation of friction engagement devices for establishing a plurality of speed change steps.

Next, a second embodiment of the invention will be described. FIG. 14 is a skeleton diagram of a vehicular automatic transmission (hereinafter, referred to as "automatic transmission") 1010. FIG. 15 is an operation table illustrating the states of operation of friction engagement elements, that is, friction engagement devices, for establishing a plurality of speed change steps. The automatic transmission 1010 is suitable for use in an FF vehicle in which the transmission is mounted in a the left-right direction of the vehicle (transverse mount). In a transmission case 1026 as a non-rotating member that is fitted to a vehicle body, the automatic transmission 1010 has a first speed changer portion 1014 that is constructed mainly of a single-pinion type first planetary gear device 1012, and a second speed changer portion 1020 that is constructed as a Ravigneaux transmission mainly of a double-pinion type second planetary gear device 1016 and a single-pinion type third planetary gear device 1018 which are both provided on a common axis C. The automatic transmission 1010 changes the rotation of an input shaft 1022 in speed, and outputs it from an output rotating member 1024. The input shaft 1022 corresponds to an input member and, in a second embodiment, is also a turbine shaft of a torque converter 1032 as a fluid transmission device that is rotationally driven by an engine 1030 that is a motive power source for the running the vehicle. Besides, the output rotating member 1024 corresponds to an output member of the automatic transmission 1010, and functions as an output gear, that is, a differential drive gear, that meshes with a differential driven gear (large-diameter gear) 1042 in order to transmit power to a differential gear device 1040 shown in FIG. 16. The output of the engine 1030 is transmitted to a pair of driving wheels 1046 via the torque converter 1032, the automatic transmission 1010, the differential gear device 1040, and a pair of axles 1044 (see FIG. 16). The automatic transmission 1010 and the torque converter 1032 are constructed substantially symmetrically about a center line (axis) C, and a half thereof below the center line C is omitted in the skeleton diagram FIG. 1.

The torque converter 1032 includes a lockup clutch 1034 as a lockup mechanism that directly transmits power of the engine 1030 to the input shaft 1022 without the intervention of fluid. The lockup clutch 1034 is a hydraulic friction clutch that is frictionally engaged by a differential pressure ΔP between the oil pressure in an engagement-side oil chamber 1036 and the oil pressure in a release-side oil chamber 1038. When the lockup clutch 1034 is completely engaged (locked up), the power of the engine 1030 is directly transmitted to the input shaft 1022. Besides, through a feedback control of the differential pressure ΔP, that is, the torque capacity, performed so that the lockup clutch 1034 is engaged in a predetermined slipping state, the turbine shaft (input shaft 1022) is rotated following the output rotating member of the engine 1030 with a predetermined slip amount of, for example, about 50 rpm, during the driving of the vehicle (power-on state); on the other hand, during the non-driving of the vehicle (power-off state), the output rotating member of the engine 1030 is rotated following the turbine shaft with a predetermined slip amount of, for example, about −50 rpm.

In the automatic transmission 1010, six forward-travel speed change steps (forward-travel gear steps), that is, the first speed change step "1st" to the sixth speed change step "6th", are established, and a reverse-travel speed change step (reverse-travel gear step) is established, in accordance with combinations of the states of coupling of the individual rotating elements of the first speed changer portion 1014 and the second speed changer portion 1020 (sun gears S1' to S3', carriers CA1' to CA3', and ring gears R1' to R3'). As shown in FIG. 15, of the forward-travel gear steps, the first speed gear step is established by the engagement of the clutch C1' and of the brake B2', and the second speed gear step is established by the engagement of the clutch C1' and of the brake B1', and the third speed gear step is established by the engagement of the clutch C1' and of the brake B3', and the fourth speed gear step is established by the engagement of the clutch C1' and of the clutch C2', and the fifth speed gear step is established by the engagement of the clutch C2' and of the brake B3', and the sixth speed gear step is established by the engagement of the clutch C2' and of the brake B1'. Besides, the reverse-travel gear step is established by the engagement of the brake B2' and of the brake B3', and a neutral state is brought about by the release of all of the clutches C1', C2', and the brakes B1' to B3'.

The operation table of FIG. 15 collectively shows relationships between the individual speed change steps and the states of operation of the clutches C1', C2' and the brakes B1' to B3'. In the table, "○" represents engagement, and "⊚" represents the engagement caused only at the time of engine brake. In particular, in parallel with the brake B2' for establishing the first speed change step "1st", a one-way clutch F1' is provided. Therefore, at the time of launch (acceleration) of the vehicle, only the clutch C1' is engaged, while at the time of application of the engine brake, both the clutch C1' and the brake B2' are engaged. Besides, the speed change ratio of each speed change step is appropriately determined by the gear ratios (=the number of teeth of the sun gear/the number of teeth of the ring gear) ρ1', ρ2', ρ3' of the first planetary gear device 1012, the second planetary gear device 1016, and the third planetary gear device 1018.

Thus, the automatic transmission 1010 of the second embodiment establishes a plurality of gear steps of different gear ratios by selectively engaging the plurality of engagement devices, that is, the clutches C1', C2' and the brakes B1' to B3'. As is apparent from the operation table of FIG. 15, the shift between the speed change steps can be performed by so-called clutch-to-clutch shifting, that is, the engagement switch between two of the clutches C1', C2' and the brakes B1' to B3'.

The clutches C1', C2' and the brake B1' to B3' (hereinafter, simply referred to as "clutches C'" and "brakes B'" if not particularly distinguished) are hydraulic friction engagement devices that are controlled and engaged by hydraulic actuators such as multi-plate clutches, brakes, etc. Through the excitation and deexcitation and the electric current control of linear solenoid valves SL1' to SL5' of a hydraulic control circuit 1050 (see FIG. 16), the engaged and released states of the clutches C1', C2' and the brake B1' to B3' are switched, and the transitional oil pressures at the time of engagement and release or the like is controlled.

Figure 16:
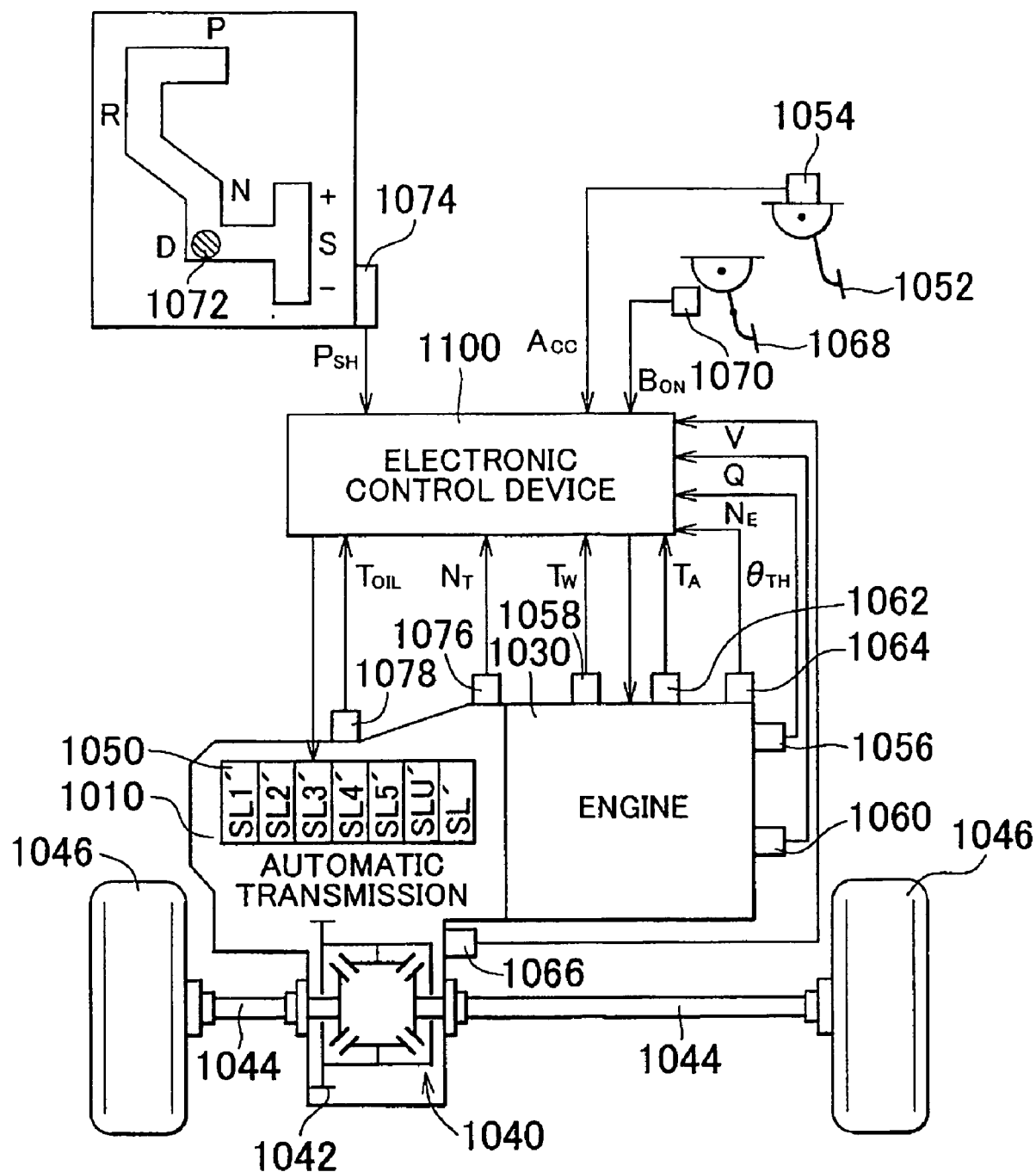
FIG. 16 is a block diagram illustrating portions of a control system that the vehicular automatic transmission shown in FIG. 14 has.

FIG. 16 is a block diagram illustrating an overall construction of portions of a control system provided in a vehicle for controlling the automatic transmission 1010 of FIG. 14 and the like, and of a power transmission system from the engine 1030 to the driving wheels 1046.

In FIG. 16, the electronic control device 1100, for example, includes a so-called microcomputer having a CPU, a RAM, a ROM, an input/output interface, etc. By performing signal processing in accordance with programs stored in the ROM while using the temporary storage function of the RAM, the CPU performs an output control of the engine 1030, a shift control of the automatic transmission 1010, an on/off control of the lockup clutch 1034, etc. The electronic control device 1100 is constructed of separate sections for the engine control, for the shift control in which the linear solenoid valve SL1' to SL5', for the lockup clutch control in which a linear solenoid valve SLU' and a solenoid valve SL' of the hydraulic control circuit 1050 are controlled, etc. in accordance with needs.

For example, the electronic control device 1100 is supplied with an accelerator operation amount signal that represents the accelerator operation amount Acc that is the amount of operation of an accelerator pedal 1052 detected by an accelerator operation amount sensor 1054, a signal that represents the engine rotation speed $N_E$ that is the rotation speed of the engine 1030 detected by an engine rotation speed sensor 1056, a signal that represents the cooling water temperature $T_W$ of the engine 1030 detected by a cooling water temperature sensor 1058, a signal that represents the intake air amount Q of the engine 1030 detected by an intake air amount sensor 1060, a signal that represents the temperature $T_A$ of intake air detected by an intake air temperature sensor 1062, a throttle opening degree signal that represents the opening degree $\theta_{TH}$ of an electronic throttle valve detected by a throttle valve opening degree sensor 1064, a vehicle speed signal that corresponds to the rotation speed $N_{OUT}$ of the output rotating member 1024, that is, the vehicle speed V, which is detected by a vehicle speed sensor 1066, a signal that represents the operation (on) $B_{ON}$ of a foot brake pedal 1068 detected by a brake switch 1070 which shows that a foot brake (wheel brake), a service brake, is working (in depression operation), a signal that represents the lever position (operation position, shift position) $P_{SH}$ of a shift lever 1072 detected by a lever position sensor 1074, a signal that represents the turbine rotation speed $N_T$ (=the rotation speed $N_{IN}$ of the input shaft 1022) detected by a turbine rotation speed sensor 1076, a signal that represents the AT oil temperature $T_{OIL}$ that is the temperature of working oil in the hydraulic control circuit 1050 which is detected by an AT oil temperature sensor 1078, etc.

The electronic control device 1100 outputs a drive signal to a throttle actuator that changes the opening degree $\theta_{TH}$ of the electronic throttle valve, an ignition signal that designates the ignition timing of the engine 1030, a fuel supply amount signal that controls the amount of fuel supplied to the engine 1030 by a fuel injection device that supplies or discontinues the supply of fuel into the intake pipe or the cylinders of the engine 1030, a lever position $P_{SH}$ display signal that activates a shift indicator, a signal that controls a shift solenoid that drives a shift valve provided in the hydraulic control circuit 1050 in order to switch the gear steps of the automatic transmission 1010, a command signal for driving a linear solenoid valve that controls the line pressure, a command signal for driving a linear solenoid valve that controls the engagement, release and the amount of slip of the lockup clutch 1034, etc.

Besides, the shift lever 1072 is disposed, for example, near the driver's seat, and is manually operated to an appropriate one of five lever positions "P", "R", "N", "D", or "S" as shown in FIG. 16.

The "P" position (range) is a parking position that opens the power transmission path in the automatic transmission 1010, that is, brings about a neutral state where the power transmission in the automatic transmission 1010 is cut off, and that mechanically stops (locks) rotation of the output shaft 1024 via a mechanical parking mechanism. The "R" position is a reverse run position that sets the rotational direction of the output shaft 1024 of the automatic transmission 1010 to the reverse rotation direction. The "N" position is a neutral position for bringing about a neutral state where the power transmission in the automatic transmission 1010 is cut off. The "D" position is a forward run position for the execution of an automatic shift control in a shift range (D range) that allows shift in the automatic transmission 10 through the use of all the forward-travel gear steps, that is, the first gear step "1st" to the sixth gear step "6th". The "S" position is a forward run position that allows manual shift by switching between a plurality of shift ranges in which the range of change of gear steps is restricted, that is, a plurality of shift ranges that are different in terms of the high speed-side gear step. The "S" position is provided with a "+" position as a lever position $P_{SH}$ for shifting the range of shift range to the up-side every time the shift lever 1072 is operated to the position, and a "−" position as a lever position $P_{SH}$ for shifting the range of shift to the down-side every time the shift lever 1072 is operated to the position.

Figure 17:
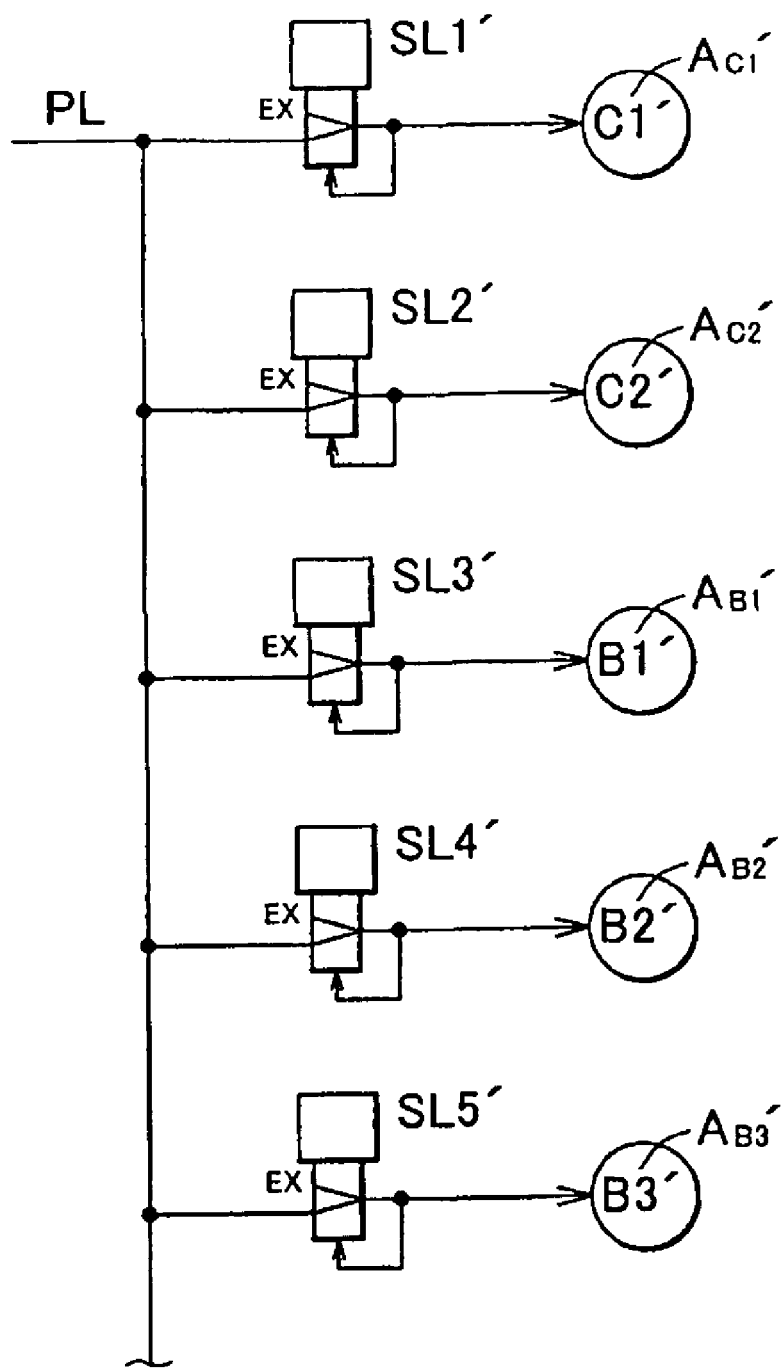
FIG. 17 is a circuit diagram regarding linear solenoid valve that control the operation of hydraulic actuators of clutches C1', C2' and brakes B1' to B3' in the hydraulic control circuit shown in FIG. 16.

FIG. 17 is a circuit diagram regarding the linear solenoid valve SL1' to SL5' that control the operation of hydraulic actuators (hydraulic cylinders) $A_{C1}'$, $A_{C2}'$, $A_{B1}'$, $A_{B2}'$, $A_{B3}'$ of the clutches C1', C2' and the brakes B1' to B3' in the hydraulic control circuit 1050.

In FIG. 17, each hydraulic actuator $A_{C1}'$, $A_{C2}'$, $A_{B1}'$, $A_{B2}'$, $A_{B3}'$ is directly supplied with an engagement oil pressure $P_{C1}'$, $P_{C2}'$, $P_{B1}'$, $P_{B2}'$, $P_{B3}'$ that is regulated from the line oil pressure PL by a corresponding one of the linear solenoid valves SLi' to SL5' in accordance with a command signal from the electronic control device 1100. The line oil pressure PL is regulated at a value in accordance with the engine load or the like that is represented by the accelerator operation amount or the degree of throttle opening, by, for example, a relief type pressure regulating valve (regulator valve) (not shown), through the use of, as a base pressure, the oil pressure generated by a mechanical oil pump 1028 (see FIG. 14) that is rotationally driven by the engine 1030.

The linear solenoid valves SL1' to SL5' basically have the same construction. Each solenoid valve is independently excited and deexcited by the electronic control device 1100 so that the oil pressure of a corresponding one of the hydraulic actuators $A_{C1}'$, $A_{C2}'$, $A_{B1}'$, $A_{B2}'$, $A_{B3}'$ is independently regulated and controlled and, accordingly, the engagement pressure $P_{C1}'$, $P_{C2}'$, $P_{B1}'$, $P_{B2}'$, $P_{B3}'$ of a corresponding one of the clutches C1', C2' and the brake B1' to B3' is controlled. Then, in the automatic transmission 1010, each speed change step is established as predetermined engagement devices are engaged, for example, as shown in the engagement operation table of FIG. 15. Besides, in the shift control of the automatic transmission 1010, a so-called clutch-to-clutch shift by the engagement switch between the release-side engagement device and the engagement-side engagement device that are involved in the shift among the clutches C' and the brakes B' is executed. For example, as shown in the engagement operation table of FIG. 15, in the 3rd speed→2nd speed downshift, the brake B3', which is the release-side engagement device, is released, and the brake B1', which is the engagement-side engagement device, is engaged. In this shift, the release transitional oil pressure of the brake B3' and the engagement transitional oil pressure of the brake B1' are appropriately controlled so as to execute the shift as fast as possible while restraining the shift shock.

Figure 18:
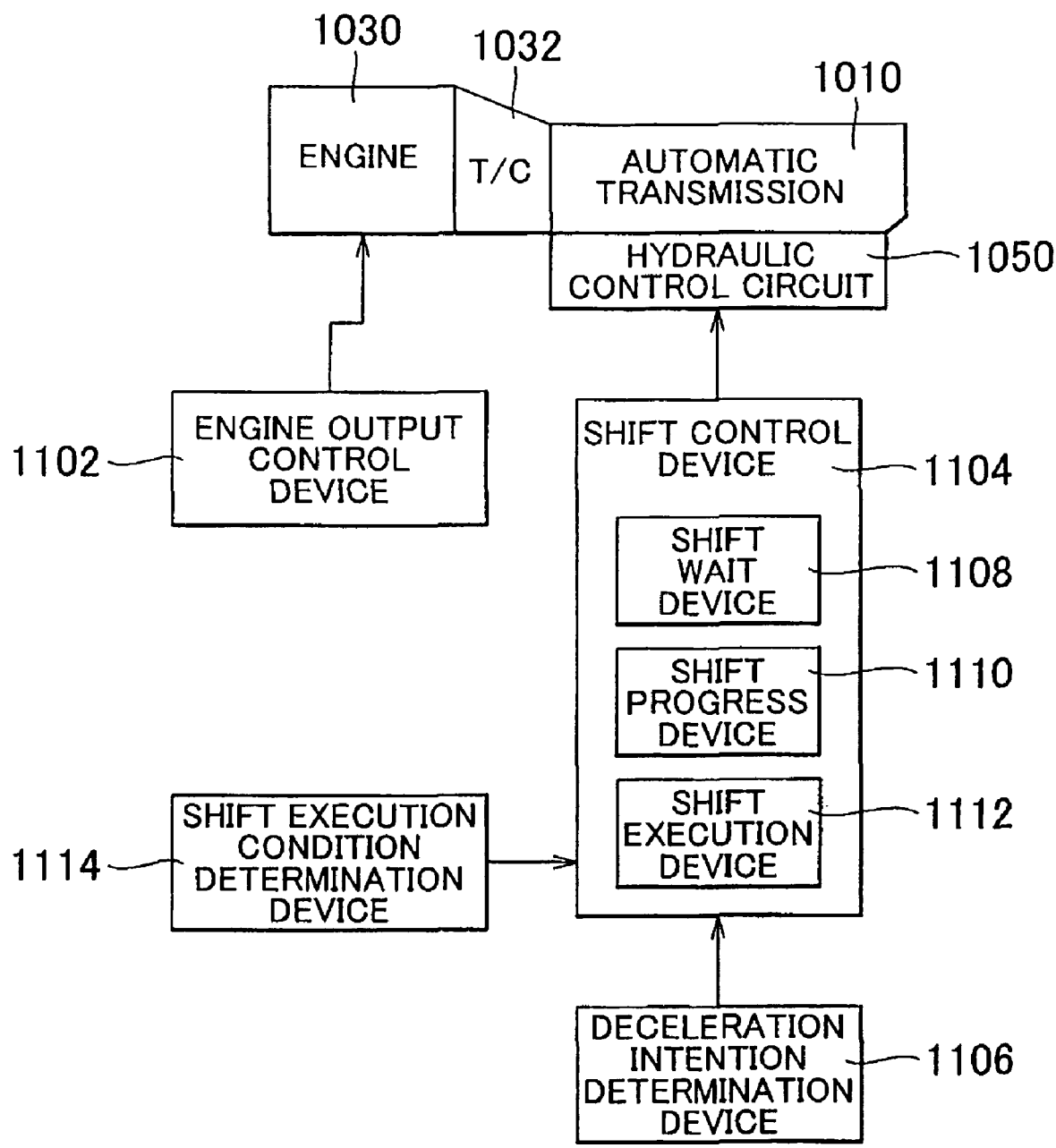
FIG. 18 is a functional block diagram illustrating portions of control functions of an electronic control device shown in FIG. 16.

FIG. 18 is a functional block diagram illustrating portions of control functions of the electronic control device 1100. In FIG. 18, an engine output control device 1102 executes the output control of the engine 1030 by controlling the opening and closing of the electronic throttle valve by the throttle actuator for the throttle control as well as controlling the fuel ignition by a fuel injection device for the fuel injection control, and controlling the ignition timing by an ignition device, such as an igniter or the like, for the ignition timing control, etc. For example, the engine output control device 1102 executes the throttle control so as to increase the throttle valve opening degree $\theta_{TH}$ as the accelerator operation amount Acc increases, by driving the throttle actuator on the basis of the accelerator operation amount signal Acc from a pre-stored relationship.

Besides, when the vehicle is stopped or decelerating or the like with the accelerator operation amount Acc being substantially null (fully closed), the engine output control device 1102 executes the throttle control so that the engine rotation speed is controlled with an idle rotation speed $N_{IDL}$ being a target value. For example, the engine output control device 1102 executes the throttle control so as to achieve a fast idle rotation speed $N_{IDLF}$ that is set higher than the post-warmup ordinary idle rotation speed $N_{IDL}$, or so as to achieve the post-warmup ordinary idle rotation speed $N_{IDL}$, on the basis of the engine cooling water temperature $T_W$ and a catalyst temperature signal from a pre-stored relationship.

A shift control device 1104 makes a shift judgment on the basis of the actual vehicle speed V and the actual accelerator operation amount Acc from a pre-stored relationship (a map, a shift chart) in which the vehicle speed V and the accelerator operation amount Acc are used as variants as shown in FIG. 6, and judges whether or not to execute the shift of the automatic transmission 1010. For example, the shift control device 1104 judges to which one of the speed change steps the automatic transmission 1010 is to be shifted, and executes the automatic shift control of the automatic transmission 1010 so as to obtain the speed change step based on the judgment. At this time, the shift control device 1104 outputs to the hydraulic control circuit 1050 a command (shift output, oil pressure command) to engage and/or release the hydraulic friction engagement devices involved in the shift of the automatic transmission 1010 so as to achieve the speed change step in accordance with, for example, the engagement table shown in FIG. 15.

In accordance with the command, the hydraulic control circuit 1050 operates the linear solenoid valve SL1' to SL5' provided in the hydraulic control circuit 1050 so that the shift of the automatic transmission 1010 is executed, thereby operating the hydraulic actuators $A_{C1}'$, $A_{C2}'$, $A_{B1}'$, $A_{B2}'$, $A_{B3}'$ of the hydraulic friction engagement devices involved in the shift.

Next, the shift chart will be described. Since FIG. 6 used for the description of the first embodiment can be immediately used for the description of the second embodiment as well, the following description will be made using FIG. 6. For example, if the shift control device 1104 judges that the actual vehicle speed V has crossed a 3rd speed→2nd speed downshift line where the 3rd speed→2nd speed downshift is to be executed (i.e., a shift point vehicle speed $V_{3-2}$ at which the 3rd speed→2nd speed downshift with the accelerator operation amount Acc being null is to be executed) while the automatic transmission 1010 is at the third speed gear step and the vehicle is decelerating with the accelerator being off, that is, in a coasting run, the shift control device 1104 outputs to the hydraulic control circuit 1050 such a command such that the working oil pressure of the brake B3' as the release-side engagement device is dropped so as to start the release of the brake B3', and such that while a certain engagement torque is maintained, the engagement of the working oil pressure of the brake B1' as the engagement-side engagement device is started so as to generate engagement torque thereof, and such that during this state, the speed change ratio is changed from the speed change ratio γ3 of the third speed gear step to the speed change ratio γ2 of the second speed gear step and also the release of the brake B3' and the engagement of the brake B1' are completed.

Incidentally, in the second embodiment, the vehicle speed V and the output rotation speed $N_{OUT}'$ are both variants that represent the vehicle speed, and are not particularly discriminated. That is, in a shift chart as shown in FIG. 6, the output rotation speed $N_{OUT}$ may be used in place of the vehicle speed V to make a shift judgment.

A deceleration intention determination device 1106 serially determines whether or not there is a driver's intention to decelerate the vehicle during a coast downshift performed by the shift control device 1104. For example, the deceleration intention determination device 1106 determines whether or not there is a driver's intention to decelerate the vehicle on the basis of the presence/absence of operation of the foot brake pedal 1068. More concretely, the deceleration intention determination device 1106 determines that there is a driver's intention to decelerate the vehicle, that is, makes an affirmative determination as to whether or not there is a driver's intention to decelerate the vehicle, if during the coast downshift a brake operation is performed so that a brake switch 1070 is put into the on-state $B_{ON}'$. On the other hand, if the brake operation is discontinued so that the brake switch 1070 is no longer in the on-state $B_{ON}'$, the deceleration intention determination device 1106 determines that the driver's intention to decelerate the vehicle has disappeared, that is, makes a negative determination as to whether there is a driver's intention to decelerate the vehicle.

In the second embodiment, the shift control device 1104 includes a shift wait device 1108 that causes the coast downshift not to progress if there is a driver's intention to decelerate the vehicle, and a shift progress device 1110 that causes the coast downshift to progress if there is not a driver's intention to decelerate the vehicle. In order to achieve both reduced shift shock and improved acceleration response at the time of re-acceleration from a decelerating state of the vehicle, the fashion of the coast downshift is altered on the basis of the presence/absence of a driver's intention to decelerate the vehicle.

Concretely, the shift wait device 1108 stops the rise of the engagement pressure of the engagement-side engagement device in the coast downshift so as to cause the coast downshift not to progress, if the deceleration intention determination device 1106 makes an affirmative determination, that is, determines that there is a driver's intention to decelerate the vehicle. The engagement-side engagement device is the hydraulic friction engagement device on the side of engagement (new engagement) in regard to the clutch-to-clutch shift in each coast downshift. In the automatic transmission 1010, the engagement-side engagement element corresponds to the brake B3' in the 6th speed→5th speed downshift, the clutch C1' in the 5th speed→4th speed downshift, the brake B3' in the 4th speed→3rd speed downshift, the brake B1' in the 3rd speed→2nd speed downshift, and the brake B2' in the 2nd speed→1st speed downshift. That is, the shift wait device 1108 stops the rise of the engagement-side oil pressure supplied to the engagement-side engagement device via the hydraulic control circuit 1050 to cause the coast downshift not to progress, if the deceleration intention determination device 1106 makes an affirmative determination. Incidentally, in the 2nd speed→1st speed downshift, this control of the engagement pressure is not performed since the one-way clutch F1' provided side by side with the brake B2' works.

The shift progress device 1110 causes the shift to progress by raising the engagement pressure of the engagement-side engagement element again if the deceleration intention determination device 1106 makes a negative determination, that is, determines that there is not a driver's intention to decelerate the vehicle, during the state where the rise of the engagement pressure of the engagement-side engagement device (the engagement-side oil pressure) has been stopped by the shift wait device 1108. That is, if the deceleration intention determination device 1106 makes a negative determination, the shift progress device 1110 causes the coast downshift to progress by raising again the engagement-side oil pressure supplied to the engagement-side engagement device via the hydraulic control circuit 1050.

Figure 19:
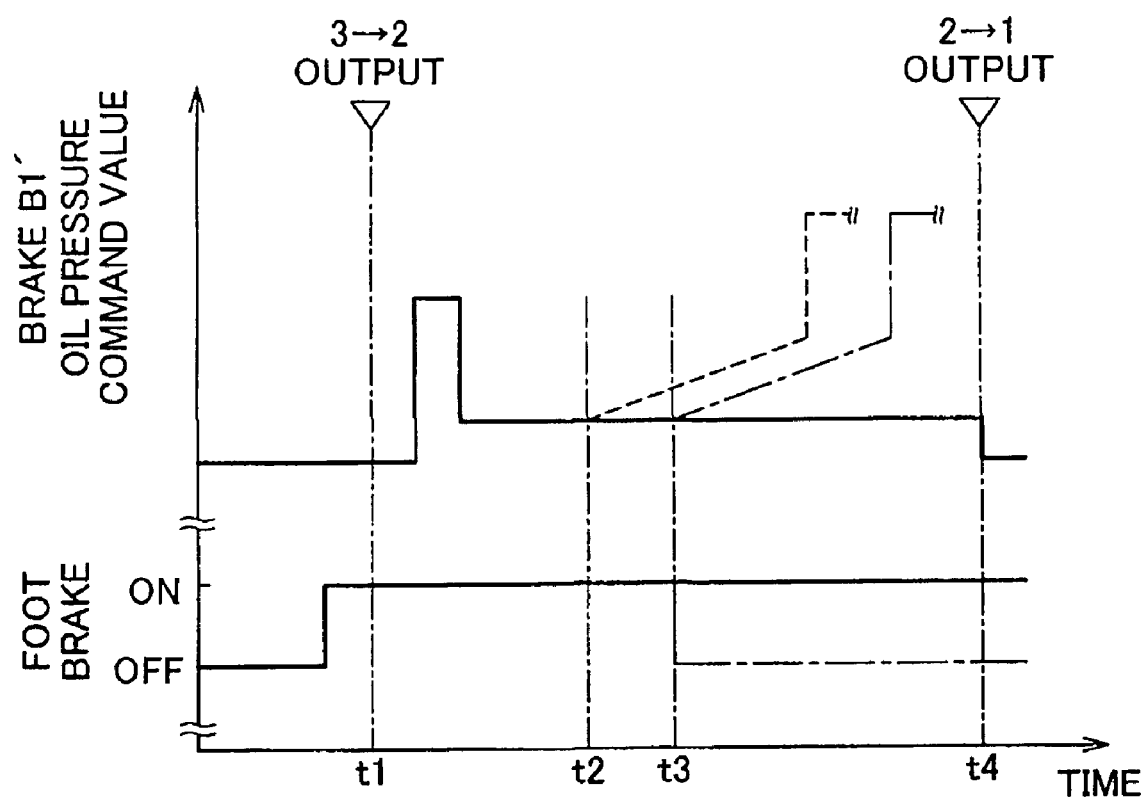
FIG. 19 is a time chart illustrating the oil pressure command value for engaging the engagement-side engagement device, that is, the brake B1', in the 3rd speed→2nd speed downshift as an example of the coast downshift, in which solid lines show an example of the case where a so-called shift wait control is executed, and one-dot chain lines show an example of the case where a so-called shift progress control is executed, and a dashed line shows an example of the ordinary case where the shift wait control is not executed.

FIG. 19 is a time chart illustrating the oil pressure command value for engaging the engagement-side engagement device, that is, the brake B1', in the 3rd speed→2nd speed downshift as an example of the coast downshift performed by the shift control device 1104. In FIG. 19, solid lines show a case where a brake operation is performed during the coast downshift, and therefore the rise of the engagement pressure of the brake B1' is stopped to cause the 3rd speed→2nd speed coast downshift not to progress, that is, a so-called shift wait control is executed. One-dot chain lines show a case where while the rise of the engagement pressure of the brake B1' has been stopped, the brake operation is discontinued, and therefore the engagement pressure of the brake B1' is raised to cause the 3rd speed→2nd speed coast downshift to progress, that is, a so-called shift progress control is executed. A dashed line shows a case where the brake B1' is engaged in an ordinary 3rd speed→2nd speed downshift in which the shift wait control is not executed. The oil pressure command value shown in FIG. 19 is a command value for controlling the state of engagement of the brake B1' via the linear solenoid valve SL3' provided in the hydraulic control circuit 1050, and corresponds one-to-one to the engagement pressure of the brake B1'.

In the time chart shown in FIG. 19, firstly at time point t1, during a coasting run, the shift control device 1104 makes a judgment for a 3rd speed→2nd speed downshift, and outputs a shift command for the 3rd speed→2nd speed downshift. In this 3rd speed→2nd speed downshift command, an oil pressure command value for releasing the brake B3' is output although not shown in the chart. Also, as shown in the chart, when the supply of the working oil pressure starts, a high oil pressure command value is output such as to rapidly charge the working oil in order to promptly close the pack clearance of the brake B1' (i.e., a so-called fast-fill control is executed). However, if the brake B' is engaged with the high oil pressure, there is possibility of occurrence of a shock. Therefore, at the starting time point of the engagement, a low oil pressure command value, that is, a low-pressure wait pressure command value, is once output.

After that, in the ordinary downshift shown by the dashed line, from time point t2 on, an apply oil pressure control is performed in which the oil pressure command value is output to the linear solenoid valve SL3' so that the oil pressure gradually increases toward the oil pressure value that is reached at the time of completion of the engagement of the brake B1', whereby the brake B1' is completely engaged.

However, in a coast downshift in which the shift wait control as shown by the solid lines is executed in which the brake switch 1070 is in the on-state $B_{ON}$ during the apply oil pressure control, while the on-state $B_{ON}$ of the brake switch 1070 is maintained, the low-pressure wait pressure command value is maintained without change, that is, the shift is caused to wait with the low-pressure wait pressure command value remaining unchanged. Thus, the rise of the engagement pressure of the brake B1' is stopped and the 3rd speed→2nd speed downshift is caused not to progress. Then, in this shift wait control, as shown at time point t4, when the shift control device 1104 makes a judgment for the 2nd speed→1st speed downshift, and outputs a shift command for the 2nd speed→1st speed downshift, the oil pressure command value is output to the linear solenoid valve SL3' so that the engagement pressure of the brake B1' becomes null, whereby the brake B1' is completely released. In consequence, in the case of the shift wait control shown by the solid lines, the 3rd speed→2nd speed downshift is not performed between time point t1 and time point t4, and the 3rd speed→1st speed downshift is performed without the intervention of the 2nd speed. Incidentally, this shift wait control is performed not only in the case where a brake operation is performed by the driver before the shift output is started (time point t1), but is similarly performed in the case where brake operation by the driver is performed after the 3rd speed→2nd speed downshift is determined.

In a coast downshift in which the shift progress control shown by the one-dot chain line is executed in which the brake operation is discontinued and therefore the brake switch 1070 is no longer in the on-state BON during the shift wait control, when it is detected as shown at time point t3 that the brake switch 1070 is no longer in the on-state $B_{ON}$, the oil pressure command value is output to the linear solenoid valve SL3' from time point t3 on so that the oil pressure gradually increases toward the oil pressure value reached at the time of completion of the engagement of the brake B1', whereby brake B1' is completely engaged. Thus, the 3rd speed→2nd speed downshift is completed. In consequence, in the case of the shift progress control shown by the one-dot chain line, after the driver's intention to decelerate the vehicle disappears during the coast downshift in which the shift wait control is being executed, the 3rd speed→2nd speed downshift is executed. If at this time, the accelerator pedal 1052 is depressed, re-acceleration is performed at the second speed gear step.

Thus, in the second embodiment, if during coast downshift by the shift control device 1104, the deceleration intention determination device 1106 makes an affirmative determination, that is, determines that there is a driver's intention to decelerate the vehicle, the shift wait device 1108 stops the rise of the engagement pressure of the engagement-side engagement device and therefore causes the coast downshift not to progress. On the other hand, if the deceleration intention determination device 1106 makes a negative determination, that is, determines that there is not a driver's intention to decelerate the vehicle, during the state where the rise of the engagement pressure of the engagement-side engagement device has been stopped by the shift wait device 1108, the shift progress device 1110 raises the engagement pressure of the engagement-side engagement device again to cause the coast downshift to progress.

Hence, generally in the coast downshift, the coast downshift control for preparing for depression of the accelerator pedal 1052 so as to enable the vehicle to accelerate in good response by appropriate driving power when the vehicle is to be accelerated again is performed. However, if there continues to be a state where it is determined that there is a driver's intention to decelerate the vehicle, the transition from the decelerating state to a stopped state of the vehicle is conceivable; therefore, the coast downshift is stopped halfway through and is caused not to progress. Thus, the occurrence of a shift shock by an unnecessary coast downshift can be prevented. On the other hand, if the driver's intention to decelerate the vehicle disappears, the change to acceleration from the decelerating state of the vehicle is conceivable; therefore, the coast downshift is caused to progress so as to prepare for depression of the accelerator pedal 1052 so that the vehicle can be accelerated in good response by appropriate driving power when the vehicle is to be accelerated again from the decelerating state. That is, it is possible to achieve both reduced shift shock and improved acceleration response at the time of re-acceleration from the decelerating state of the vehicle.

Incidentally, while during the shift wait control by the shift wait device 1108, the input rotation speed $N_{IN}$ of the automatic transmission 1010 (i.e., the turbine rotation speed $N_T$) rises so that there is a large rotation speed difference $\Delta N_{T-DN}$ ($=N_T-N_{DN}$) between the turbine rotation speed $N_T$ and the synchronous rotation speed $N_{DN}$ for the shift-target gear step DN ($N_{DN}=N_{OUT} \times \gamma_{DN}$, where $\gamma_{DN}$ is the speed change ratio of the shift-target gear step DN) in the coast downshift by the shift control device 1104, the brake operation can sometimes be discontinued so that the shift progress device 1110 causes the coast downshift to progress before the judgment for the shift to a lower-side gear step DNL that is on the lower side of the shift-target gear DN. In such a case, the downshift to the original shift-target gear step DN is executed, and therefore there is possibility of occurrence of an increased shift shock in association with the large rotation speed difference $\Delta N_{T-DN}$ because the engagement time of the engagement device is restricted through consideration of the discomfort caused to the driver or the like, and the durability, etc. (see a dashed line in FIG. 21).

The coasting run is a so-called non-driven state where the engine rotation speed $N_E$ and the turbine rotation speed $N_T$ are dragged by the driving wheels 1046, and where the turbine rotation speed $N_T$ or the like is set at a rotation speed that is uniquely determined from the vehicle speed V (or the output rotation speed $N_{OUT}$) and from the speed change ratio $\gamma$ of the automatic transmission 1010, that is, the synchronous rotation speed for that speed change ratio $\gamma$. During the shift wait control by the shift wait device 1108, the automatic transmission 1010 is put in the neutral state, so that the throttle control or the like performed by the engine output control device 1102 to keep the engine rotation speed $N_E$ at the idle rotation speed $N_{IDL}$ results in the turbine rotation speed $N_T$ rising toward the engine rotation speed $N_E$ by an amount that corresponds to the disappearance of the load of the automatic transmission 1010.

Referring back to FIG. 18, a shift execution device 1112 is provided in the shift control device 1104. If, during the state where the rise of the engagement pressure of the engagement-side engagement device has been stopped by the shift wait device 1108, that is, during the shift wait control by the shift wait device 1108, the turbine rotation speed $N_T$ rises so that the rotation speed difference $\Delta N_{T-DN}$ between the turbine rotation speed $N_T$ and the synchronous rotation speed $N_{DN}$ becomes large, the shift execution device 1112 performs such a control as to avoid the coast downshift to the shift-target gear step $D_N$ so that the frequency of shift shocks is reduced, that is, so that in the pursuit of both reduced shift shock and improved acceleration response at the time of re-acceleration from the decelerating state of the vehicle, the shift shock reduction is further enhanced; concretely, the shift execution device 1112 causes the shift control device 1104 to execute the coast downshift to a lower speed-side gear step $D_{NL}$ instead of the shift-target gear step $D_N$, upon satisfaction of a condition A that the turbine rotation speed $N_T$ have exceeded the synchronous rotation speed $N_{DN}$ by more than a predetermined value (set value) A. This condition A is a shift execution condition for executing the coast downshift to a lower speed-side gear step DNL.

A shift execution condition determination device 1114 determines whether or not the turbine rotation speed $N_T$ has exceeded the synchronous rotation speed $N_{DN}$ by more than the set value A, that is, whether or not the condition A holds, on the basis of, for example, whether or not the turbine rotation speed $N_T$ has become greater than a rotation speed ($=N_{DN}+A$) obtained by adding the set value A to the synchronous rotation speed $N_{DN}$. The set value A is an empirically determined and pre-stored shift execution determination value for compulsorily executing the downshift to a lower speed-side gear step DNL through the use of a rotation speed difference $\Delta N_{T-DN}$ with restriction due to possible increase of shift shock being caused by the execution of the downshift to the shift-target gear step DN, in the pursuit of both reduced shift shock and improved acceleration response.

In addition to the condition A, the shift execution device 1112 may also be provided with a shift execution condition B that makes it possible to cope with a concern that a large amount of time may be required prior to completion of the downshift and therefore the acceleration response at the time of re-acceleration may deteriorate if during the shift to the lower speed-side gear step DNL, there is risk of increase of the rotation speed difference $\Delta N_{DNL-T}$ ($=N_{DLT}-N_T$) between the turbine rotation speed $N_T$ and the synchronous rotation speed $N_{DNL}$ for the lower speed-side gear step DNL ($N_{DNL}=N_{OUT} \times \gamma_{DNL}$ where $\gamma_{DNL}$ is the speed change ratio of the lower speed-side gear step DNL). The condition B is that the rotation speed difference $\Delta N_{DNL-T}$ have been continuously decreasing. The shift execution device 1112 may cause the shift control device 1104 to execute the coast downshift to the lower speed-side gear step DNL instead of the shift-target gear step DN if the condition A and the condition B hold.

In the case where the condition B is added as a shift execution condition, the shift execution condition determination device 1114 determines whether or not the turbine rotation speed $N_T$ has exceeded the synchronous rotation speed $N_{DN}$ by more than the set value A and the rotation speed difference $\Delta N_{DNL-T}$ has been continuously decreasing, that is, whether or not both the condition A and the condition B hold. The shift execution condition determination device 1114 determines whether or not the rotation speed difference $\Delta N_{DNL-T}$ has continuously decreased on the basis of, for example, whether or not the rotation speed difference $\Delta N_{DNL-T}$ calculated in every predetermined cycle that is defined by the flowchart of the coast downshift control (see FIG. 20) has decreased successively an N number of times.

The number of times N is an empirically determined and pre-stored shift execution criterion value for assuring that the turbine rotation speed $N_T$ has certainly come close to the synchronous rotation speed $N_{DNL}$ and therefore there is no concern that after the command to shift to the lower speed-side gear step DNL is output, the rotation speed difference $\Delta N_{DNL-T}$ may have increased and therefore the required time prior to the shift completion at the time of the accelerator-on state may become long. That is, the number of times N is an empirically determined and pre-stored criterion value for defining a predetermined period for determining that the rotation speed difference $\Delta N_{DNL-T}$ has been continuously decreasing in order to determine the presence of a state where the turbine rotation speed $N_T$ is steadily approaching the synchronous rotation speed $N_{DNL}$ for the lower speed-side gear step DNL.

Besides the conditions A and B, another condition may be added to set the shift execution condition. For example, it is allowable to add a condition C that the turbine rotation speed $N_T$ have risen into the range of a predetermined value (set value) B from the synchronous rotation speed $N_{DNL}$. The shift execution condition determination device 1114 determines whether or not the turbine rotation speed $N_T$ has risen into the range of the set value B from the synchronous rotation speed $N_{DNL}$, that is, whether or not the condition C holds, on the basis of, for example, whether or not the turbine rotation speed $N_T$ has become greater than a rotation speed ($=N_{DNL}-B$) obtained by subtracting the set value B from the synchronous rotation speed $N_{DNL}$. The set value B is an empirically determined and pre-stored shift execution criterion value for improving the acceleration response by restricting the rotation speed difference $\Delta N_{DNL-T}$ so as to shorten the completion time of the shift to the lower speed-side gear step DNL since, in the pursuit of both improved acceleration response and reduced shift shock, the greater the rotation speed difference $\Delta N_{DNL-T}$ during the accelerator-on state following the output of the command to shift to the lower speed-side gear step DNL, the longer the time up to the generation of driving power (until the turbine rotation speed $N_T$ reaches the synchronous rotation speed $N_{DNL}$).

Furthermore, it is also allowable to add a condition d that the vehicle speed V be lower than a DNL→DN upshift line for making a judgment for the upshift from the lower speed-side gear step DNL to the shift-target gear step DN, that is, a shift point vehicle speed $V_{DNL-DN}$ at which the DNL→DN upshift with the accelerator operation amount Acc being null is to be executed. The shift execution condition determination device 1114 determines whether or not the vehicle speed V is lower than the DNL→DN upshift line during coasting, that is, whether or not the condition D holds, on the basis of, for example, whether or not the vehicle speed V has become lower than the shift point vehicle speed $V_{DNL-DN}$. The condition D is a shift execution condition for preventing the shift hunting in which the downshift to the lower speed-side gear step DNL and the upshift to the shift-target gear step DN alternate.

In the case where the aforementioned conditions A, B, C and D are employed as the shift execution condition, the shift execution condition determination device 1114 determines whether or not the condition A, the condition B, the condition C and the condition D hold. Then, if the conditions A, B, C and D hold, the shift execution device 1112 causes the shift control device 1104 to execute the coast downshift to the lower speed-side gear step DNL instead of the shift-target gear step DN.

Figure 20:
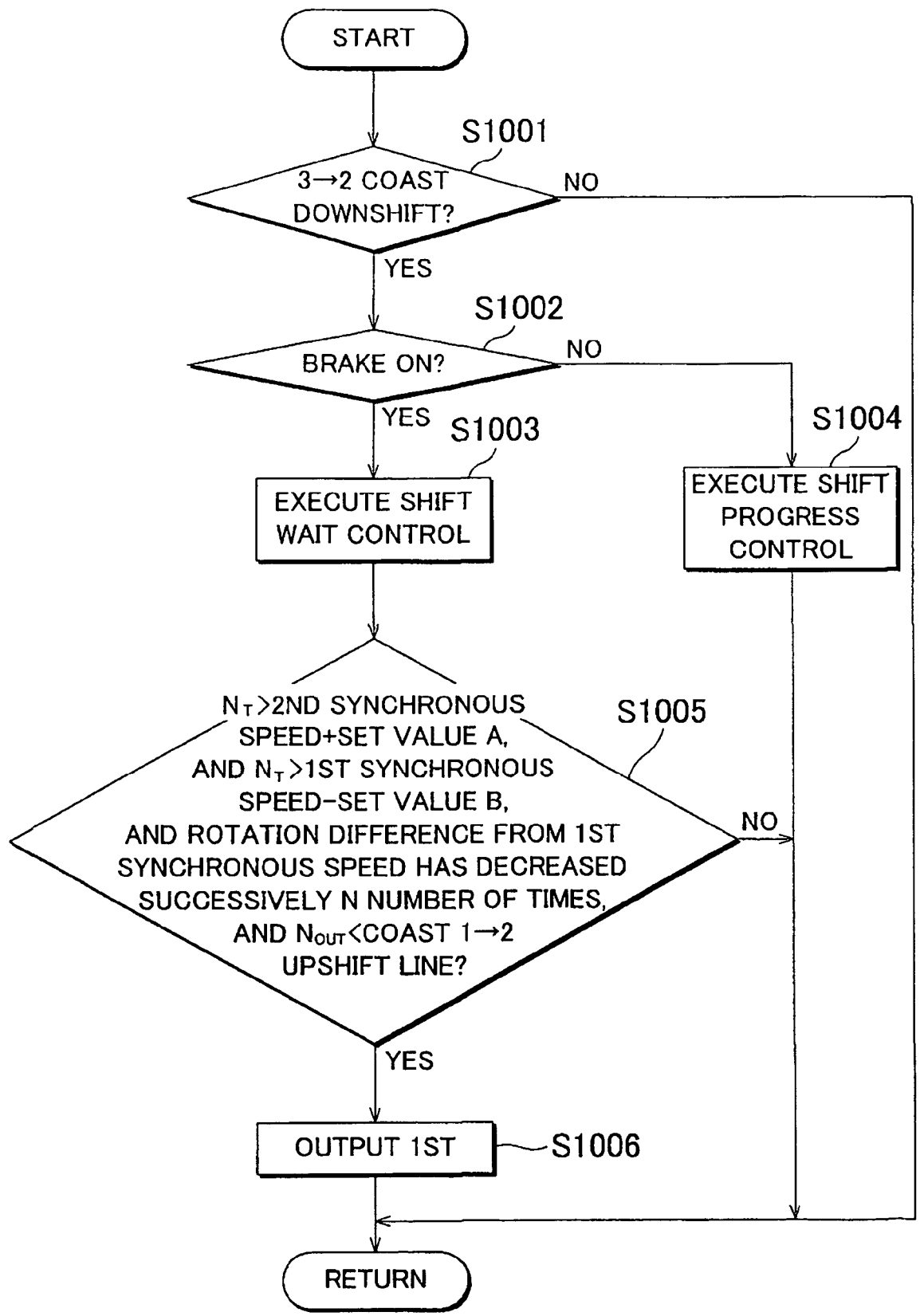
FIG. 20 is a flowchart illustrating a portion of the control operation of the electronic control device shown in FIG. 16, that is, a control operation of altering the fashion of the 3rd speed→2nd speed coast downshift on the basis of the presence/absence of a driver's intention to decelerate the vehicle.
Figure 21:
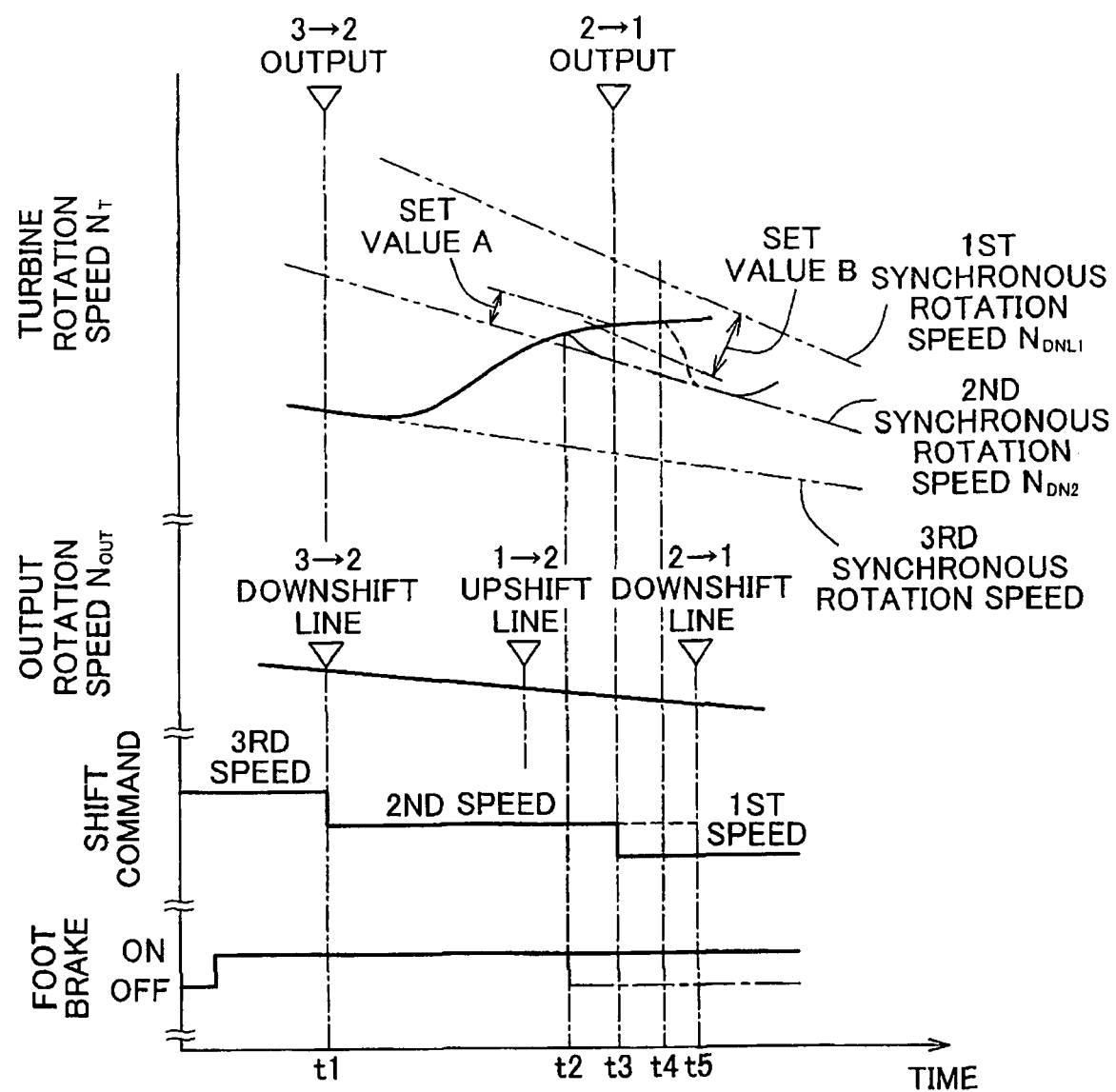
FIG. 21 is a time chart illustrating the control operation shown by the flowchart of FIG. 20.

FIG. 20 is a flowchart illustrating a portion of the control operation of the electronic control device 1100, that is, a control operation of altering the fashion of the 3rd speed→2nd speed coast downshift on the basis of the presence/absence of a driver's intention to decelerate the vehicle. This control operation is repeatedly executed in a predetermined cycle, for example, a very short cycle time of about several msec to several ten msec. FIG. 21 is a time chart illustrating the control operation shown by the flowchart of FIG. 20.

In FIG. 20, in step (hereinafter, "step" will be omitted) S1001 corresponding to the shift control device 1104, it is judged whether or not to execute a shift of the automatic transmission 1010 on the basis of the actual vehicle speed V and the actual accelerator operation amount Acc from a shift chart, for example, as shown in FIG. 6, that is, it is judged whether or not during a coasting run, the actual vehicle speed V has crossed the 3rd speed→2nd speed downshift line, that is, the shift point vehicle speed $V_{3-2}$, where the 3rd speed→2nd speed downshift with the accelerator operation amount Acc being null is to be executed. It is also judged whether or not a shift command for obtaining the speed change step based on the judgment, that is, for the 3rd speed→2nd speed downshift, has been output.

In FIG. 21, time point t1 shows that during the coasting run, the judgment for the 3rd speed→2nd speed downshift is made and the shift command for the 3rd speed→2nd speed downshift is output.

If a negative judgment is made in S1001, this routine is ended. However, if an affirmative judgment is made in S1001, the process proceeds to S1002 corresponding to the deceleration intention determination device 1106. In S1002, it is determined whether or not there is a driver's intention to decelerate the vehicle during the coast downshift on the basis of, for example, the presence/absence of operation of the foot brake pedal 1068, that is, whether or not the brake switch 1070 is in the on-state $B_{ON}$.

In FIG. 21, solid lines indicate a case where the brake switch 1070 continues to be in the on-state $B_{ON}$ during the coast downshift following time point t1, and one-dot chain lines indicate a case where at time point t2 during the coast downshift, the bake operation is discontinued and therefore the brake switch 1070 is no longer in the on-state $B_{ON}$, and dashed lines indicate a case where at time point t4 during the coast downshift, the brake operation is discontinued and therefore the brake switch 1070 is no longer in the on-state $B_{ON}$.

If an affirmative judgment is made in S1002, that is, if it is determined that the brake switch 1070 is in the on-state $B_{ON}$ and therefore there is a driver's intention to decelerate the vehicle, the shift wait control is executed in S1003 corresponding to the shift wait device 1108. That is, the rise of the engagement-side oil pressure supplied to the brake B1', that is, the engagement-side engagement device in the 3rd speed→2nd speed coast downshift, via the hydraulic control circuit 1050 is stopped, and therefore the 3rd speed→2nd speed downshift is not caused to progress.

The solid lines in FIG. 21 show that although the command to shift to the second speed gear step has been output, the downshift to the second speed gear step is not caused to progress.

Subsequently to S1003, in S1005 corresponding to the shift execution condition determination device 1114, it is determined whether or not the shift execution condition holds on the basis of whether or not the turbine rotation speed $N_T$ has become greater than the rotation speed ($=N_{DN2}+A$) obtained by adding the set value A to the synchronous rotation speed $N_{DN2}$ for the second speed gear step, and the turbine rotation speed $N_T$ has become greater than the rotation speed ($=N_{DNL1}-B$) obtained by subtracting the set value B from the synchronous rotation speed $N_{DNL1}$ for the first speed gear step, that is, the lower speed-side gear step DNL, and the rotation speed difference $\Delta N_{DNL-T}$ ($=N_{DNL1}-N_T$) between the turbine rotation speed $N_T$ and the synchronous rotation speed $N_{DNL1}$ has successively decreased an N number of times, and the vehicle speed V ($N_{OUT}$) is lower than the costing-time 1→2 upshift line (shift point vehicle speed $V_{1-2}$).

If a negative judgment is made in S1005, the routine is ended. However, if an affirmative judgment is made in S1005, the process proceeds to S1006 corresponding to the shift execution device 1112. In S1006, a shift command for the 2nd speed→1st speed downshift is output so that the coast downshift to the first speed gear step instead of the second speed gear step is executed.

The slid lines in FIG. 21 show that during the execution of the shift wait control in S1003, the shift command for the 2nd speed→1st speed downshift is compulsorily output due to the establishment of the shift execution condition at time point t3 prior to time point t5 at which the judgment for the 2nd speed→1st speed downshift is to be made from the 2nd speed→1st speed downshift line.

If a negative judgment is made in S1002, that is, if it is determined that the brake switch 1070 is not in the on-state $B_{ON}$ and therefore there is not a driver's intention to decelerate the vehicle, the shift progress control is executed in S1004 corresponding to the shift progress device 1110. That is, the engagement-side oil pressure supplied to the brake B1', that is, the engagement-side engagement device in the 3rd speed→2nd speed coast downshift, via the hydraulic control circuit 1050 is raised to cause the 3rd speed→2nd speed downshift to progress.

The one-dot chain lines and the dashed lines in FIG. 21 show that during the execution of the shift wait control, the foot brake is released (OFF) thereby causing the 3rd speed→2nd speed downshift to progress, at time point t2 or time point t4 prior to time point t5 at which the judgment for the 2nd speed→1st speed downshift is to be made. As shown by the dashed lines, if the 3rd speed→2nd speed downshift is caused to progress at time point t4 at which the rotation speed difference $\Delta N_{T-DN2}$ ($=N_T - N_{DN2}$) between the turbine rotation speed $N_T$ and the synchronous rotation speed $N_{DN2}$ for the second speed gear step, that is, the shift-target gear step DN in the 3rd speed→2nd speed coast downshift, is relatively large, there is possibility of occurrence of a relatively great shift shock. In reality, however, in the second embodiment, the shift command for the 2nd speed→1st speed downshift is output at time point t3 prior to time point t4 due to the execution of S1005 and S1006. Therefore, even if the foot brake is released (OFF) at time point t4, the 3rd speed→2nd speed downshift is not caused to progress, that is, the 3rd speed→2nd speed coast downshift is avoided, so that a shift shock does not occur.

As described above, according to the second embodiment, during the state where the rise of the engagement pressure of the engagement-side engagement device in a coast downshift has been stopped by the shift wait device 1108, the coast downshift to the lower speed-side gear step DNL instead of the shift-target gear step DN is executed by the shift execution device 1112 on the condition A that the turbine rotation speed $N_T$ have exceeded the synchronous rotation speed $N_{DN}$ for the shift-target gear step DN of the coast downshift by more than the predetermined value A. Therefore, when the turbine rotation speed $N_T$ rises so that the rotation speed difference $\Delta N_{T-DN}$ thereof from the synchronous rotation speed $N_{DN}$ becomes large, the coast downshift to the shift-target gear step DN is avoided, so that the frequency of shift shocks can be reduced. That is, when both reduced shift shock and improved acceleration response at the time of re-acceleration from the decelerating state of the vehicle are pursued, the shift shock can be further reduced.

Furthermore, according to second embodiment, besides the condition A, it is allowable to employ the condition B that the rotation speed difference $\Delta N_{DNL-T}$ between the turbine rotation speed $N_T$ and the synchronous rotation speed $N_{DNL}$ for the lower speed-side gear step DNL has been continuously decreasing, in order for the shift execution device 1112 to execute the coast downshift to the lower speed-side gear step DNL instead of the shift-target gear step DN. Therefore, it becomes possible to cope with a concern that a long time may be required prior to the shift and therefore the acceleration response at the time of re-acceleration of the vehicle may deteriorate when there is risk of the rotation speed difference $\Delta N_{DNL-T}$ becoming large in the process of the shift to the lower speed-side gear step DNL.

Furthermore, according to the second embodiment, the deceleration intention determination device 1106 determines whether or not there is a driver's intention to decelerate the vehicle on the basis of the presence/absence of brake operation. If brake operation is performed, the deceleration intention determination device 1106 makes an affirmative determination. However, if the brake operation is discontinued, the deceleration intention determination device 1106 makes a negative determination. Thus, the presence/absence of a driver's intention to decelerate the vehicle is appropriately determined.

While the second embodiment of the invention has been described in detail with reference to the drawings, the invention is applicable in other fashions as well.

For example, in the second embodiment, the deceleration intention determination device 1106 determines that the driver's intention to decelerate the vehicle has disappeared if the brake operation is discontinued and the brake switch 1070 is no longer in the on-state $B_{ON}$. However, the deceleration intention determination device 1106 may determine that the driver's intention to decelerate the vehicle has disappeared in the case where the brake operation is discontinued and the brake master cylinder pressure has become less than or equal to a predetermined value. Furthermore, cases other than the case where the brake operation has disappeared may be adopted as bases for the determination. For example, it may be determined that the driver's intention to decelerate the vehicle has disappeared, in any one of the case where the brake operation has been discontinued, the case where the accelerator has been operated, and the case where the discontinuing rate of the brake operation amount is greater than or equal to a predetermined value. For example, the deceleration intention determination device 1106 may determine that the driver's intention to decelerate the vehicle has disappeared in the case where accelerator operation has been performed and therefore it is not determined that the accelerator operation amount Acc is null, that is, in the case where the engine 1030 is not in the idle state. Or the deceleration intention determination device 1106 determines that the driver's intention to decelerate the vehicle has disappeared in the case where the rate of change of the return amount $\theta_{SC}$ of the foot brake pedal 1068 is greater than or equal to a predetermined value or the rate of change in the decreasing direction of the brake master cylinder pressure becomes greater than or equal to a predetermined value and therefore the discontinuing rate of the brake operation amount becomes greater than or equal to a predetermined value.

Although in the second embodiment, the conditions A, B and C as the shift execution condition which are objects of determination by the shift execution condition determination device 1114 include the comparison between the turbine rotation speed $N_T$ and the synchronous rotation speed $N_{DN}$ (or the synchronous rotation speed $N_{DNL}$), the turbine rotation speed $N_T$ may be replaced by the engine rotation speed $N_E$.

Furthermore, in the second embodiment, the shift wait device 1108 may execute the shift wait control by using a condition that the vehicle be not in the turning state (in the turning run) in addition to the aforementioned conditions. In other words, the shift progress device 1110 may execute the shift progress control if the vehicle is in a turning state. When the vehicle is turning, there is high possibility of accelerating the vehicle again immediately after performing a brake operation for the turn. Therefore, this operation suitably restrains deterioration of the acceleration performance at the time of re-acceleration during the turning of the vehicle.

Furthermore, in conjunction with the foregoing second embodiment, a control that includes the 3rd speed→2nd speed downshift, and the 3rd speed→1st speed downshift performed without the intervention of the second speed change step, that is, a one-way-clutch shift, has been described as an example of the coast downshift. However, the invention is widely applied to coast downshifts performed by the engagement switch between the release-side engagement device and the engagement-side engagement device during deceleration of the vehicle. It goes without saying that the invention is suitably applicable also to the control of a downshift other than the 3rd speed→2nd speed downshift and the 3rd speed→1st speed downshift, and of a clutch-to-clutch shift that does not include the one-way clutch shift.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. In a vehicular automatic transmission that establishes a plurality of gear steps of different gear ratios by selectively engaging a plurality of engagement elements, a shift control device of a vehicular automatic transmission that performs a coast downshift by engagement switch between a release-side engagement element and an engagement-side engagement element at a time of deceleration of a vehicle, comprising:
    a deceleration intention determination device that determines whether or not there is a driver's intention to decelerate the vehicle during the coast downshift;
    a shift wait device that stops a rise of an engagement pressure of the engagement-side engagement element so as to cause the coast downshift not to progress, if the deceleration intention determination device makes an affirmative determination; and
    a shift progress device that raises again the engagement pressure of the engagement-side engagement element so as to cause the coast downshift to progress, if the deceleration intention determination device makes a negative determination while the rise of the engagement pressure has been stopped by the shift wait device.

2. The shift control device of the vehicular automatic transmission according to claim 1,
    wherein the engagement elements are hydraulic friction engagement devices, and
    wherein the shift wait device stops a rise of an engagement-side oil pressure supplied to a hydraulic friction engagement device on the engagement side so as to cause the coast downshift not to progress, if the deceleration intention determination device makes an affirmative determination, and
    wherein the shift progress device raises again the engagement-side oil pressure supplied to the hydraulic friction engagement device on the engagement side so as to cause the coast downshift to progress, if the deceleration intention determination device makes a negative determination.

3. The shift control device of the vehicular automatic transmission according to claim 1, wherein the deceleration intention determination device determines that the driver's intention to decelerate the vehicle has disappeared if it is determined that there exists any one of a situation that a brake operation has been discontinued, a situation that an accelerator operation has been performed, and a situation that a discontinuing rate of a brake operation amount is greater than or equal to a predetermined value.

4. The shift control device of the vehicular automatic transmission according claim 1, further comprising a vehicle turn determination device that determines whether or not the vehicle is in a turning state,
    wherein the shift wait device stops the rise of the engagement pressure of the engagement-side engagement element so as to cause the coast downshift not to progress on a condition that the vehicle turn determination device have made a negative determination.

5. The shift control device of the vehicular automatic transmission according to claim 4, wherein the shift wait device raises again the engagement pressure of the engagement-side engagement element so as to cause the coast downshift to progress on a condition that the vehicle turn determination device have made an affirmative determination.

6. The shift control device of the vehicular automatic transmission according to claim 1, further comprising a shift execution device that causes execution of the coast downshift to a lower speed-side gear step that is on a lower side of the shift-target gear step, instead of the shift-target gear step, on a first condition that the input rotation speed of the vehicular automatic transmission have exceeded a synchronous rotation speed for the shift-target gear step of the coast downshift by more than a predetermined value while the rise of the engagement pressure of the engagement-side engagement element has been stopped by the shift wait device.

7. The shift control device of the vehicular automatic transmission according to claim 6, wherein the shift execution device causes the execution of the coast downshift to the lower speed-side gear step on a second condition that a rotation speed difference between the input rotation speed of the vehicular automatic transmission and the synchronous rotation speed for the lower speed-side gear step have been continuously decreasing, in addition to the first condition.

8. In a vehicular automatic transmission that establishes a plurality of gear steps of different gear ratios by selectively engaging a plurality of engagement elements, a shift control method of a vehicular automatic transmission that performs a coast downshift by engagement switch between a release-side engagement element and an engagement-side engagement element at a time of deceleration of a vehicle, comprising:
    determining whether or not there is a driver's intention to decelerate the vehicle during the coast downshift;
    stopping a rise of an engagement pressure of the engagement-side engagement element so as to cause the coast downshift not to progress, if an affirmative determination is made regarding the intention to decelerate the vehicle; and
    raising again the engagement pressure of the engagement-side engagement element so as to cause the coast downshift to progress, if a negative determination is made regarding the intention to decelerate the vehicle while the rise of the engagement pressure has been stopped.

9. The shift control method of the vehicular automatic transmission according to claim 8,
  wherein the engagement elements are hydraulic friction engagement devices,
  wherein a rise of an engagement-side oil pressure supplied to a hydraulic friction engagement device on the engagement side is stopped so as to cause the coast downshift not to progress, if an affirmative determination is made regarding the intention to decelerate the vehicle, and
  wherein the engagement-side oil pressure supplied to the hydraulic friction engagement device on the engagement side is raised again so as to cause the coast downshift to progress, if a negative determination is made regarding the intention to decelerate the vehicle.

10. The shift control method of the vehicular automatic transmission according to claim 8, wherein it is determined that the driver's intention to decelerate the vehicle has disappeared if it is determined that there exists any one of a situation that a brake operation has been discontinued, a situation that an accelerator operation has been performed, and a situation that a discontinuing rate of a brake operation amount is greater than or equal to a predetermined value.

11. The shift control method of the vehicular automatic transmission according to claim 8, further comprising determining whether or not the vehicle is in a turning state,
  wherein the rise of the engagement pressure of the engagement-side engagement element is stopped so as to cause the coast downshift not to progress on a condition that a negative determination have been made regarding the turning state of the vehicle.

12. The shift control method of the vehicular automatic transmission according to claim 11, wherein the engagement pressure of the engagement-side engagement element is raised again so as to cause the coast downshift to progress on a condition that an affirmative determination have been made regarding the turning state of the vehicle.

13. The shift control method of the vehicular automatic transmission according to claim 8, further comprising causing execution of the coast downshift to a lower speed-side gear step that is on a lower side of the shift-target gear step, instead of the shift-target gear step, on a first condition that the input rotation speed of the vehicular automatic transmission have exceeded a synchronous rotation speed for the shift-target gear step of the coast downshift by more than a predetermined value while the rise of the engagement pressure of the engagement-side engagement element has been stopped.

14. The shift control method of the vehicular automatic transmission according to claim 13, wherein the coast downshift to the lower speed-side gear step is executed on a second condition that a rotation speed difference between the input rotation speed of the vehicular automatic transmission and the sychronous rotation speed for the lower speed-side gear step have been continuously decreasing, in addition to the first condition.

* * * * *